US007278485B2

(12) United States Patent
Kirsner et al.

(10) Patent No.: US 7,278,485 B2
(45) Date of Patent: *Oct. 9, 2007

(54) METHOD OF FORMULATING AND USING A DRILLING MUD WITH FRAGILE GELS

(75) Inventors: Jeff Kirsner, Humble, TX (US); Don Siems, Houston, TX (US); Kimberly Burrows-Lawson, Kingwood, TX (US); David Carbajal, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/933,560

(22) Filed: Sep. 4, 2004

(65) Prior Publication Data

US 2005/0032652 A1 Feb. 10, 2005

Related U.S. Application Data

(63) Continuation of application No. 10/175,272, filed on Jun. 19, 2002, now Pat. No. 6,887,832, which is a continuation-in-part of application No. 09/929,465, filed on Aug. 14, 2001, now abandoned, and a continuation-in-part of application No. PCT/US00/35609, filed on Dec. 29, 2000, and a continuation-in-part of application No. PCT/US00/35610, filed on Dec. 29, 2000.

(51) Int. Cl.
*E21B 43/00* (2006.01)
*C09K 8/36* (2006.01)
*C09K 8/035* (2006.01)
*C09K 8/04* (2006.01)

(52) U.S. Cl. .................... 166/305.1; 166/244.1; 166/282; 166/283; 166/285; 507/117; 507/138

(58) Field of Classification Search ............... 507/103, 507/136, 116, 138, 137, 100, 117; 166/244.1, 166/282, 283, 285, 305.1
See application file for complete search history.

(56) References Cited

U.S. PATENT DOCUMENTS

| 2,816,073 | A | 12/1957 | Stratton |
| 2,873,253 | A | 2/1959 | Stanphill |
| 2,994,660 | A | 8/1961 | Reddie et al. |
| 3,127,343 | A | 3/1964 | Reddie et al. |
| 3,654,177 | A | 4/1972 | Foley |
| 3,684,012 | A | 8/1972 | Scheffel et al. |
| 3,728,277 | A | 4/1973 | Foley |
| 3,878,110 | A | 4/1975 | Miller et al. |
| 3,878,117 | A | 4/1975 | Williams et al. |
| 3,912,683 | A | 10/1975 | O'Farrell |
| 3,954,627 | A | 5/1976 | Dreher et al. |
| 3,988,246 | A | 10/1976 | Hartfiel |
| 4,007,149 | A | 2/1977 | Burton et al. |
| 4,010,111 | A | 3/1977 | Chappell et al. |
| 4,012,329 | A | 3/1977 | Hayes et al. |
| 4,142,595 | A | 3/1979 | Anderson et al. |
| 4,148,821 | A | 4/1979 | Nussbaum et al. |
| 4,151,096 | A | 4/1979 | Jackson |
| 4,153,588 | A | 5/1979 | Makowski et al. |
| 4,240,915 | A | 12/1980 | Block |
| 4,255,268 | A | 3/1981 | Block |
| 4,264,455 | A | 4/1981 | Block |
| 4,366,070 | A | 12/1982 | Block |
| 4,390,474 | A | 6/1983 | Nussbaum et al. |
| 4,422,927 | A | 12/1983 | Dorsey et al. |
| 4,422,947 | A | 12/1983 | Dorsey et al. |
| 4,425,462 | A | 1/1984 | Turner et al. |
| 4,428,845 | A | 1/1984 | Block |
| 4,447,338 | A | 5/1984 | Lundberg et al. |
| 4,473,479 | A | 9/1984 | Block |
| 4,488,975 | A | 12/1984 | Almond |
| 4,508,628 | A | 4/1985 | Walker et al. |

(Continued)

FOREIGN PATENT DOCUMENTS

| AU | B-75043/94 | 3/1995 |
| CA | 2 088 697 | 2/1992 |
| DE | 40 18 228 A1 | 12/1991 |
| DE | 44 20 455 A1 | 12/1995 |
| DE | 196 43 840 A1 | 5/1998 |
| DE | 196 43 857 A1 | 5/1998 |
| EP | 0 254 412 B1 | 6/1987 |
| EP | 0 124 194 B1 | 3/1988 |
| EP | 0 247 801 B1 | 11/1990 |
| EP | 0 561 608 A | 9/1993 |

(Continued)

OTHER PUBLICATIONS

P. A. Boyd, D.L. Whitfill, T. S. Carter, and J. P. Allamon, New Based Oil Used in Low Toxicity Oil Muds, First Page Only, no date.
Friedheim, J. E., "Second Generation Drilling Fluids", 1996.
"Bio-Bore" (TM) Horizontal Directional Drilling Fluid OCncentrate, Baroid Products Data Sheet, no date.

(Continued)

*Primary Examiner*—Michael J Feely
(74) *Attorney, Agent, or Firm*—Karen B. Tripp; Craig W. Roddy

(57) ABSTRACT

A method for drilling, running casing in, and/or cementing a borehole in a subterranean formation without significant loss of drilling fluid is disclosed, as well as compositions for use in such method. The method employs a drilling fluid comprising a fragile gel or having fragile gel behavior and providing superior oil mud rheology and overall performance. The fluid is especially advantageous for use in deep water wells because the fluid exhibits minimal difference between downhole equivalent circulating density and surface density notwithstanding differences in drilling or penetration rates. When an ester and isomerized olefin blend is used for the base of the fluid, the fluid makes an environmentally acceptable and regulatory compliant invert emulsion drilling fluid. The fluid preferably contains no organophilic clays.

40 Claims, 10 Drawing Sheets

U.S. PATENT DOCUMENTS

| | | | |
|---|---|---|---|
| 4,552,215 A | 11/1985 | Almond et al. | |
| 4,553,601 A | 11/1985 | Almond et al. | |
| 4,559,233 A | 12/1985 | Chen et al. | |
| 4,619,772 A | 10/1986 | Black et al. | |
| 4,659,486 A * | 4/1987 | Harmon | 507/107 |
| 4,670,501 A | 6/1987 | Dymond et al. | |
| 4,671,883 A | 6/1987 | Connell et al. | |
| 4,777,200 A | 10/1988 | Dymond et al. | |
| 4,787,990 A | 11/1988 | Boyd | |
| 4,802,998 A | 2/1989 | Mueller et al. | |
| 4,810,355 A | 3/1989 | Hopkins | |
| 4,816,551 A | 3/1989 | Oehler et al. | |
| 4,900,456 A | 2/1990 | Ogilvy | |
| 4,941,983 A | 7/1990 | Coates et al. | |
| 4,964,615 A | 10/1990 | Mueller et al. | |
| 5,027,901 A | 7/1991 | French et al. | |
| 5,045,219 A | 9/1991 | Trahan et al. | |
| 5,106,516 A | 4/1992 | Mueller et al. | |
| 5,189,012 A | 2/1993 | Patel et al. | |
| 5,232,910 A | 8/1993 | Mueller et al. | |
| 5,237,080 A | 8/1993 | Daute et al. | |
| 5,252,554 A | 10/1993 | Mueller et al. | |
| 5,254,531 A | 10/1993 | Mueller et al. | |
| 5,308,401 A | 5/1994 | Geke et al. | |
| 5,318,954 A | 6/1994 | Mueller et al. | |
| 5,318,955 A | 6/1994 | Mueller et al. | |
| 5,318,956 A | 6/1994 | Mueller et al. | |
| 5,330,662 A | 7/1994 | Jahnke et al. | |
| 5,333,698 A | 8/1994 | Van Slyke | |
| 5,382,290 A | 1/1995 | Nahm et al. | |
| 5,403,508 A | 4/1995 | Reng et al. | |
| 5,403,822 A | 4/1995 | Mueller et al. | |
| 5,407,909 A | 4/1995 | Goodhue, Jr. et al. | |
| 5,432,152 A | 7/1995 | Dawson et al. | |
| 5,441,927 A | 8/1995 | Mueller et al. | |
| 5,498,596 A | 3/1996 | Ashjian et al. | |
| 5,508,258 A | 4/1996 | Mueller et al. | |
| 5,552,462 A | 9/1996 | Yeh | |
| 5,569,642 A | 10/1996 | Lin | |
| 5,589,442 A | 12/1996 | Gee et al. | |
| 5,591,699 A | 1/1997 | Hodge | |
| 5,605,879 A | 2/1997 | Halliday et al. | |
| 5,607,901 A | 3/1997 | Toups, Jr. et al. | |
| 5,620,946 A | 4/1997 | Jahnke | |
| 5,635,457 A | 6/1997 | Van Slyke | |
| 5,710,110 A | 1/1998 | Cooperman et al. | |
| 5,744,677 A | 4/1998 | Wu | |
| 5,789,352 A | 8/1998 | Carpenter et al. | |
| 5,837,655 A | 11/1998 | Halliday et al. | |
| 5,846,913 A | 12/1998 | Sawdon | |
| 5,849,974 A | 12/1998 | Clarembeau et al. | |
| 5,851,958 A | 12/1998 | Halliday et al. | |
| RE36,066 E | 1/1999 | Mueller et al. | |
| 5,869,433 A | 2/1999 | Patel | |
| 5,869,434 A | 2/1999 | Mueller et al. | |
| 5,877,378 A | 3/1999 | Overstreet et al. | |
| 5,909,779 A | 6/1999 | Patel et al. | |
| 5,929,297 A | 7/1999 | Theriot et al. | |
| 5,958,845 A | 9/1999 | Van Slyke | |
| 5,960,878 A | 10/1999 | Nguyen et al. | |
| 6,001,790 A | 12/1999 | Schmitt et al. | |
| 6,017,854 A | 1/2000 | Van Slyke | |
| 6,022,833 A | 2/2000 | Mueller et al. | |
| 6,034,037 A | 3/2000 | Van Slyke | |
| 6,090,754 A | 7/2000 | Chan et al. | |
| 6,107,255 A | 8/2000 | Van Slyke | |
| 6,110,874 A | 8/2000 | Van Slyke | |
| 6,159,906 A | 12/2000 | McNally et al. | |
| 6,165,946 A * | 12/2000 | Mueller et al. | 507/203 |
| 6,180,572 B1 | 1/2001 | Mueller et al. | |
| 6,187,719 B1 | 2/2001 | Dino et al. | |
| 6,204,224 B1 * | 3/2001 | Quintero et al. | 507/123 |
| 6,211,119 B1 | 4/2001 | Herold et al. | |
| 6,289,989 B1 | 9/2001 | Mueller | |
| 6,339,048 B1 * | 1/2002 | Santhanam et al. | 507/131 |
| 6,451,953 B1 | 9/2002 | Albright | |
| 6,462,096 B1 * | 10/2002 | Dino et al. | 516/101 |
| 6,515,031 B2 | 2/2003 | Fefer | |
| 6,589,917 B2 * | 7/2003 | Patel et al. | 507/138 |
| 6,620,770 B1 | 9/2003 | Kirsner et al. | |
| 6,828,279 B2 | 12/2004 | Patel et al. | |
| 6,861,393 B2 | 3/2005 | Temple et al. | |
| 6,887,832 B2 * | 5/2005 | Kirsner et al. | 507/103 |
| 6,908,887 B2 | 6/2005 | Thaemlitz | |
| 6,989,353 B2 | 1/2006 | Temple et al. | |
| 7,008,907 B2 | 3/2006 | Kirsner et al. | |
| 2001/0009890 A1 | 7/2001 | Patel et al. | |
| 2003/0036484 A1 | 2/2003 | Kirsner et al. | |
| 2003/0064897 A1 | 4/2003 | Krisner et al. | |
| 2003/0114316 A1 | 6/2003 | Patel et al. | |
| 2003/0144153 A1 | 7/2003 | Krisner et al. | |
| 2004/0043905 A1 | 3/2004 | Miller et al. | |
| 2004/0082483 A1 | 4/2004 | Muller et al. | |
| 2004/0102332 A1 | 5/2004 | Thompson et al. | |
| 2004/0110642 A1 | 6/2004 | Thompson et al. | |
| 2004/0152603 A1 | 8/2004 | Kirsner et al. | |
| 2004/0171498 A1 | 9/2004 | Miller | |
| 2005/0032652 A1 | 2/2005 | Kirsner et al. | |
| 2005/0049147 A1 | 3/2005 | Patel et al. | |
| 2005/0137093 A1 | 6/2005 | Miller | |
| 2006/0073987 A1 | 4/2006 | Mueller et al. | |
| 2007/0078060 A1 | 4/2007 | Kirsner et al. | |
| 2007/0078061 A1 | 4/2007 | Kirsner et al. | |
| 2007/0078062 A1 | 4/2007 | Kirsner et al. | |
| 2007/0082822 A1 | 4/2007 | Kirsner et al. | |
| 2007/0082824 A1 | 4/2007 | Bell et al. | |

FOREIGN PATENT DOCUMENTS

| | | |
|---|---|---|
| EP | 1 424 380 A1 | 6/2004 |
| EP | 1 111 024 B1 | 10/2004 |
| EP | 0 134 173 A1 | 3/2005 |
| GB | 2166782 A | 5/1986 |
| GB | 2212192 A | 7/1989 |
| GB | 2287052 A | 9/1995 |
| GB | 2309240 A | 7/1997 |
| WO | WO 83/00249 | 9/1983 |
| WO | WO 83/02949 | 9/1983 |
| WO | WO 95/21225 | 8/1985 |
| WO | WO 93 23491 A | 11/1993 |
| WO | WO 94/16030 | 7/1994 |
| WO | WO 95/09215 | 4/1995 |
| WO | WO 95 26386 | 10/1995 |
| WO | WO 96 22342 | 7/1996 |
| WO | WO-96/22342 A1 | 7/1996 |
| WO | WO 98/18882 | 5/1998 |
| WO | WO 99 50370 A | 10/1999 |
| WO | WO 00 71241 A | 11/2000 |
| WO | WO 02/053675 A1 | 7/2002 |
| WO | WO 02/053676 A1 | 7/2002 |

OTHER PUBLICATIONS

E. Van Oort, et al., "New Flat-Rheology Synthetic-Based Mud for Improved Deepwater Drilling," SPE 90987, pp. 1-11, SPE Annual Tech. Conf. & Exh.., Houston, TX, Sep. 26-29, 2004.

P.A. Bern, et al., "The Influence of Drilling Variables on Barite Sag," SPE 36670, 8 pages, pp. 887-894, SPE Annual Tech. Conf. & Exh., Houston, TX, Oct. 6-9, 1996.

E. Van Oort, et al., "Accessing Deep Reservoirs by Drilling Severly Depleted Formations," SPE/IADC 79861, pp. 1-9, SPE/IADC Drilling Conf., Amsterdam, Netherlands, Feb. 19-21, 2003.

Wood, et al., "Synthetics Reduce Trouble Time in Ultra-Deepwater Borehole," Offshore, Mar. 1998, pp. 85, 86, 141.

J.M. Davison, et al., "Rheology of Varios Drilling Fluid Systems Under Deepwater Drilling Conditions and the Importance of Accurate Predictions of Downhole Fluid Hydraulics," SPE 56632, pp. 1-11, SPE Annual Tech. Conf. & Exh., Houston, TX, Oct. 3-6, 1999.

J. Lee et al., "A New Approach to Deepwater Drilling Using SBM with Flat Rheology," AADE-04-DF-HO-37, pp. 1-13, AADE Drilling Fluids Tech. Conf., Houston, TX Apr. 5-7, 2004.

P.M. Hanson, et al., "Investigation of Barite 'Sag' in Weighted Drilling Fluids in Highly Deviated Wells," SPE 20423, 8 pages, pp. 223-230, 65th Annual Tech. Conf. & Exh. of the Society of Petroleum Engineers, New Orleans, LA, Sep. 23-26, 1990.

N. Morita, et al., "Theory of Lost Circulation Pressure" SPE 20409, 16 pages, pp. 43-58, 65th Annual Tech. Conf. & Exh. of the Society of Petroluem Engineers, New Orleans, LA, Sep. 23-26, 1990.

Glin-Fa Fuh, et al., "A New Approach to Preventing Lost Circulation White Drilling," SPE 24599, 14 pages, pp. 569-582, 67th Annual Tech. Conf. & Exh. of the Society of Petroluem Engineers, Washington, DC, Oct. 4-7, 1992.

E.C. Onyla, "Experimenetal Data Analysis of Lost Circulation Problems During Drilling With Oil-Based Mud," SPE Drilling & Completing, Mar. 1994, pp. 25-31.

M. Zamora, et al., "The Top 10 Mud-Related Concerns in Deepwater Drilling Operations," SPE 59019, pp. 1-9, SPE International Petroluem Conf. & Exh., Villahermosa, Mexico, Feb. 1-3, 2000.

Mario Zamora, et al., "Rules of Thumb to Improve High-Angle Hole Cleaning," Petroleum Engineering International, Jan. 1991, pp. 44-46, 48, 51.

Mario Zamora, et al., "More Rules of Thumb to Improve High-Angle Hole Cleaning," Petroleum Engineering International, Feb. 1991, pp. 22, 24. 26, 27.

Shell Neodol product information sheets from http://www.shellchemicals.com/neodol/1,1098,506.00html retrieved on Mar. 11, 2005 (9 page list).

Litigation Documents regarding related U.S. Patent No. 6,887,832 B2, issued May 3, 2005, being filed herewith in accord with MPEP 2001.06(c).

Baroid Drilling Fluids, Inc. brochure entitled "PETROFREE™ The Biodegradable Solution for High-Performance Drilling," (1998) 8 pages.

A. Samuels, "H2S Need Not Be Deadly, Dangerous, Destructive," Soc. Petroleum Engineers, SPE 5202, (1974).

R.K. Clark, et al., "Polyacrylamide/Potassium-Chloride Mud for Drilling Water-Sensitive Shales," J Petroleum Tech. 719-729 SPE 5514 (Jun. 1976).

J.E. Friedheim, et al, "An Environmentally Superior Replacement for Mineral-Oil Drilling Fluids," 299-312, SPE 23062 (Sep. 3-6, 1991).

J.H. Rushing, et al., "Bioaccumulation from Mineral Oil-Wet and Synthetic Liquid-Wet Cuttings in an Estuarine Fish," 311-320, SPE 23350 (Nov. 10-14, 1991).

F.V. Jones, et al, "The Chronic Toxicity of Mineral Oil-Wet and Synthetic Liquid-Wet Cuttings on an Estuarine Fish, Fundulus grandis," 721-730, SPE 23497 (Nov. 10-13, 1991).

J.E. Friedheim, et al., "Superior Performance with Minimal Environmental Impact:: A Novel Nonaqueous Drilling Fluid," 713-726, SPE 25753 (Feb. 23-25, 1993).

S. Park, et al., "The Success of Synthetic-Based Drilling Fluids Offshore Gulf of Mexico: A Field Comparison to Conventional Systems," 405-418, SPE 26354 (1993).

M. Slater, "Commonly Used Biodegradation Techniques for Drilling Fluid Chemicals, Are They Appropriate," 387-397, SPE/IADC 29376 (1995).

J. Candler, et al., "Seafloor Monitoring for Synthetic-Based Mud Discharged in the Western Gulf of Mexico," 51-69, SPE 29694 (1995).

J.E. Friedheim, et al, "Second Generation Synthetic Fluids in the North Sea: Are They Better?", 215-226, IADC/SPE 350061 (1996).

M.A. Legendre Zevallos, et al., "Synthetic-Based Fluids Enhance Environmental and Drilling Performance in Deepwater Locations," 235-242, SPE 35329 (1996).

E.A. Vik, et al, "Factors Affecting Methods for Biodegradation Testing of Drilling Fluids for Marine Discharge," 697-711, SPE 35981 (1996).

L. Bailey, et al., "Filtercake Integrity and Reservoir Damage," 111-120, SPE 39429, (1998).

P.A. Bern, et al., "Barite Sag: Measurement, Modeling and Management," IADC/SPE 47784 (9 pages) (1998).

L. Xiao, et al., "Studies on the Damage Induced by Drilling Fluids in Limestone Cores," SPE 50711 (17 pages) (1999).

A. Meinhold, "Framework for a Comparative Environmental Assessment of Drilling Fluids Used Offshore," SPE 52746 (10 pages) (1999).

L.J. Fraser, et al., "Formation-Damaging Characteristics of Mixed Metal Hydroxide Drill-In Fluids and a Comparison with Polymer-Base Fluids," SPE 57714 (1999).

P.A. Bern, et al, "Barite Sag: Measurement, Modeling, and Management," SPE 62051, SPE Drill. & Completion 15(1) 25-30 (Mar. 2000).

A. Saasen, et al, "Prediction of Barite Sag Potential of Drilling Fluids from Rheological Measurements," SPE/IADC 29410 (Feb. 26-Mar. 2, 1995).

P.I. Reid, et al, "Field Evaluation of a Novel Inhibitive Water-Based Drilling Fluid for Tertiary Shales," SPE 24979 (Nov. 16-18, 1992).

W. Hite, et al, Better Practices and Synthetic Fluid Improve Drilling Rates, Oil & Gas J. Online (Feb. 20, 1995).

N. Hands, et al, "Drill-in Fluid Reduces Formation Damage, Increases Production Rates," Oil & Gas J. Online (1998).

J.P. Plank, "Water-Based Muds Using Synthetic Polymers Developed for High Temperature Drilling," Oil & Gas J. Online (1992).

Brookfield Press Release on Vane Spindles (Mar. 12, 2002), ThomasNet Product News Room.

EPA Development Document for Proposed Effluent Limitations Guidelines for Standards for Synthetic-Based Drilling Fluid and Other Non-Aqueous Drilling Fluids . . . (Feb. 1999).

Environmental Impacts of Synthetic Based Drilling Fluids, U.S. Dept of the Interior, Minerals Management Service, Aug. 2000.

EPA Environmental Assessment of Proposed Effluent Limitations Guidelines for Synthetic-Based Drilling Fluids and Other Non-Aqueous Drilling Fluids . . . (Feb. 1999).

"Horizontal Wells Offer Economic Advantage," Horizontal News, Fall 1996.

A. Saasen, et al, "Monitoring of Barite Sag Important in Deviated Drilling," Oil & Gas J. Online (1991).

Novadril (TM) System, MI Technology Report (1993).

G. Robinson et al, Novel Viscometer for Improved Drilling Fluid Characterization, Baker Hughes INTEQ (1996).

N.J. Alderman, et al, "Vane Rheometry of Bentonite Gels," 39 J. Non-Newtonian Fluid Mechanics 291-310 (1991).

API Recommended Practice Standard Procedure for Field Testing Oil-Based Drilling Fluids, API Rec. Prac. 13B-2, 3rd. ed. (Feb. 1998) American Petroleum Institute.

Depostion Transcript of David Carbajal, co-inventor of US 6,887,832, in Civil Action 6:05CV155, US Dist. Ct. (E.D. TX), Halliburton Energy Serv. v. M-I, LLC, (Jan. 12, 2006).

Deposition Transcript of Kimberly Burrows, co-inventor of US 6,887,832 in Civil Action 6:05CV155, US Dist. Ct. (E.D. TX), Halliburton Energy Serv. v. M-I, LLC, (Oct. 26, 2005).

Deposition Transcript of Don Siems, co-inventor of US 6,887,832 in Civil Action 6:05CV155, US Dist. Ct. (E.D. TX), Halliburton Energy Serv. v. M-I, LLC, (Dec. 12, 2005).

Deposition Transcript of Jeff Kirsner, co-inventor of US 6,887,832 in Civil Action 6:05CV155, US Dist. Ct. (E.D. TX), Halliburton Energy Serv. v. M-I, LLC, (Feb. 15, 2006).

Deposition Transcript of Karen Tripp, patent prosecuting attorney for US 6,887,832, CV 6:05CV155, US Dist. Ct. (E.D. TX), Halliburton Energy Serv. v. M-I, LLC, (Jan. 26, 2006).

First Amended Complaint, Civil Action No. 6:05CV155, U.S. Dist. Court, Eastern Dist. of Texas, Tyler Div., Halliburton Energy Services, Inc. v. M-I, LLC., filed Jan. 27, 1006.

M-I, LLC's 2nd Amended Answer, Affirmative Defenses, and Counterclaims, Civil Action No. 6:05CV155, U.S. Dist. Court, Eastern Dist. of Texas, Tyler Div., filed Feb. 10, 2005.

Plaintiff's Preliminary Infringement Contentions, Civil Action No. 6:05CV155, U.S. Dist. Court, Eastern Dist. of Texas, Halliburton Energy Services, Inc. v. M-I LLC, Sep. 16, 2005.

M-I, LLC's Preliminary Invalidity Contentions, CA No. 6:05CV155, U.S. Dist. Court, Eastern Dist. of Texas, Halliburton Energy Services, Inc. v. M-I, LLC, Oct. 28, 2005.

K. Burrows, et al., "New Low Viscosity Ester is Suitable for Drilling Fluids in Deepwater Applications," SPE 66553, Feb. 2001 (14 pages).

L.F. Nicora, "High-Density Invert-Emulsion System with Very Low Solids Content to Drill ERD and HPHT Wells," SPE 65000, Feb. 2001 (17 pages).

D. Eckhout, et al., "Development Process and Field Applications of a New Ester-based Mud System for ERD Wells on Australia's Northwest Shelf," IADC/SPE 62791 (Sep. 2002).

M. Mas, et al, "A New High-Temperature Oil-Based Drilling Fluid," SPE 53941, Venezuela Apr. 1999 (14 pages).

C. Cameron, et al, "Drilling Fluids Design and Management for Extended Reach Drilling," IADC/SPE 72290, Oct. 2001 (7 pages).

L. Knox, et al, "New Developments in Ester-based Mud Technology," AADE-02-DFWM-HO-41, Apr. 2002 (9 pages).

L.J. Fraser, "Field Application of the All-Oil Drilling Fluid," IADC/SPE 19955, Feb. 27-Mar. 2, 1990).

Halliburton's Proposed Terms and Claim Elements for Construction, CV 6.05CV155, US Dist. Ct. (E.D. TX), Halliburton Energy Serv. v. M-I, LLC, Nov. 21, 2005.

Defendant M-I, L.L.C.'s List of Disputed Claim Terms, Civil Action No. 6:05CV155, U.S. Dist. Court, (E.D. TX), Halliburton Energy Services, Inc. v. M-I LLC, Nov. 21, 2005.

Plaintiff's Preliminary Claim Constructions Pursuant to Local Patent Rule 4-2, CV 6.05CV155, US Dist. Ct. (E.D. TX), Halliburton Energy Serv. v. M-I, LLC, Dec. 23, 2005.

Defendant M-I, LLC's Preliminary Claim Construction and Identification of Extrinsic Evidence for U.S. Patent No. 6,887,832, CV 6.05CV155, US Dist. Ct. (E.D. TX),Dec. 23, 2005.

Joint Claim Construction and Prehearing Statement Pursuant to P.R. 4-3, CV 6.05CV155, US Dist. Ct. (ED TX), Halliburton Energy Serv. v. M-I, LLC Jan. 20, 2006.

Defendant M-I, LLC's Motion for Summary Judgment of Invalidity with Respect to U.S. Patent No. 6,887,832, Jan. 13, 2006.

M-I LLC's Motion for Leave to Add Inequitable Conduct Defense to its Pleadings, CV 6.05CV155, US Dist. Ct. (ED TX), Halliburton Energy Serv. v. M-I, LLC, Jan. 26, 2006.

Halliburton's Opposition to M-I's Motion for Leave to Add Inequitable Conduct Defense to its Pleadings, CV 6.05CV155, US Dist. Ct., Halliburton v. M-I, Feb. 13, 2006.

Plaintiff's Initial Disclosures, Civil Action 6.05CV155, US Dist. Ct. (ED TX), Halliburton Energy Services, Inc. v. M-I, LLC, Sep. 16, 2005.

Defendant M-I, LLC's Initial Disclosures, Civil Action 6.05CV155, US Dist. Ct. (ED TX), Halliburton Energy Services, Inc. v. M-I, LLC, Aug. 19, 2005.

Plaintiff Halliburton's Objections and Responses to Defendant M-I LLC's First Set of Requests for Production, Civil Action 6.05CV155, Halliburton v. MI, Aug. 26, 2005.

Plaintiff Halliburton's Objections and Responses to Defendant M-I LLC's First Set of Interrogatories, Civil Action 6.05CV155, Halliburton v. MI, Aug. 26, 2005.

Plaintiff Halliburton's Supplemental Responses and Objections to Defendant M-I LLC's First Set of Interrogatories, Civil Action 6.05CV155, Halliburton v. MI, Oct. 25, 2005.

M-I, LLC's Responses to Plaintiff's First Set of Interrogatories to Defendant (Nos. 1-21), Civil Action 6.05CV155, US Dist. Ct. (ED TX), Halliburton v. MI, Nov. 16, 2005.

Halliburton's Opening Brief on Claim Construction,Civil Action 6.05CV155, US Dist. Ct. (ED TX), Halliburton Energy Services, Inc. v. M-I, LLC, Mar. 17, 2006.

Halliburton's Unopposed Motion for Leave to Exceed Page Limit for its Markman Brief, CV 6.05CV155, US Dist. Ct., Halliburton Energy Services, Inc. v. M-I, LLC, Mar. 17, 2006.

Defendant M-I,LLC's Reply in Support of its Motion for Summary Judgment of Invalidity with Respect to U.S. Patent No. 6,887,832 with exhibits, Apr. 18, 2006.

M-I, LLC's Responsive Brief on the Construction of the Asserted Claims of U.S. Patent No. 6,887,832 with exhibits, Apr. 18, 2006.

Halliburton's Unopposed Motion for Leave to Exceed Page Limit for its Surreply in Opposition to M-I's Motion for Summary Judgment of Invalidity with the Surreply and other exh, Apr. 28, 2006.

Halliburton's Unopposed Motion for Leave to Exceed Page Limit for Reply Brief on Claim Construction with the Reply Brief and other exhibits, Apr. 28, 2006.

Baroid Drilling Fluids Product Information Sheet on RM-63, Rheology Modifier (1990) (2 pages).

Baroid Drilling Fluids Product Data Sheets (1993) (121 pages).

Manual of Drilling Fluids Technology, Fundamental Characteristics of Drilling Fluids, NL Baroid/NL Industries, Inc. (1979) (22 pages).

Halliburton Drilling Fluids Technology—Introduction to Drilling, Dril-N & Completion Fluids, 1999.

Minute Entry for Markman Hearing Proceedings in Halliburton v. M-I, 6-05cv155, U.S. District Ct., Eastern District of Texas, May 12, 2006.

Transcript of Markman Hearing Before Hon. L. Davis in Halliburton v. M-I, 6-05cv155, U.S. District Ct., Eastern District of Texas, May 12, 2006.

Friedheim, J. E., "Second Generation Drilling Fluids", 1996.

Halliburton Energy Services, Baroid Technology, Eng. & Dev. Lab. Tech. Serv. (TS-2058) Dimer & Trimer Eval. As Primary Viscosifiers Using "PETROFREE" Apr. 17, 2001.

Halliburton Energy Services, Baroid Technology, Eng. & Dev. Lab. Tech. Serv. (TS-2055) Addition of Dimer & Trimer Modifiers to MI NOVADRIL Drilling Fluid Apr. 4, 2001.

Halliburton Energy Services, Baroid Technology, Eng. & Dev. Lab. Tech. Serv. (TS-2039) Primary Rheological Eval. Using Various Dimer & Trimer Acids, Feb. 12, 2001.

Halliburton Energy Services, Baroid Technology, Eng. & Dev. Lab. Tech. Serv. (TS-2037) Primary Rheological Eval. Using Various Dimer & Trimer Acids, Feb. 21, 2001.

Halliburton Energy Services, Baroid Technology, Eng. & Dev. Lab. Tech. Serv. (TS-2065) Dimer & Trimer Low End Rheology Modifier Study at Higher Conc. & Temp, Jun. 12, 2001.

Baroid, A. Halliburton Co., Report FM-0691, Proj.Q3767, Formulation WOrk on an 11, 14 & 16lb/gal IO drilling flui, Internal Memorandum, Nov. 5, 1999.

Baroid Drilling Fluids, Res. & Eng. & Anal. Serv/Support (TS-0724), Fann 70 Analysis of PETROFREE Muds Nov. 12, 1993.

Baroid report No. EMB-5680, Project No. M386, Aug. 31, 1995.

Baroid report No. EMB-5723, Project No. M565, Dec. 11, 1995.

Baroid report No. EMB-5718, Project No. M630. Dec. 1, 1995.

Baroid Drilling Fluids, Res. & Eng. & Anal. Serv/Support (TS-1146S1), Compound of Downhole Rheological & Suspension Prop. at A PETROFREE mud vs. a PETROFREE LE mud. Nov. 22, 1996.

Baroid Drilling Fluids, Res. & Eng. & Anal. Serv/Support (TS-0865), Composition of a 13.4lb.gal PETROFREE mud Dec. 6, 1994.

Baroid Drilling Fluids, Res. & Eng. Report No. EMB 5408, PROJECT No. 1559, Test sample of a Submitted Sample Jul. 12, 1994.

Baroid Drilling Fluids, Res. & Eng. & Anal. Serv/Support (EMB 5530) Analysis of PETROFREE Muds & Coatings from a well, Jan. 27, 1995.

Halliburton, Baroid Tech. Eng. & Dev. Lab. Internal Mem., Report No. FM 1376, Project No. Q895 Fann 75 Rheological Properties on the NovaPlus fluids. Jul. 30, 2002.

Baroid, a Halliburton Company, Internal Mem., Report No. FM-80804, Project No. Q4701, Fann 75 on an Nova Plus field mud, May 1, 2000.

Baroid Drilling Fluids, Res. & Eng. & Anal. Serv/Support (TS-0842), Eval. & Reconditioning of a PETROFREE mud, Oct. 7, 1994.

Baroid Drilling Fluids, Res. & Eng. & Anal. Serv/Support (TS-0858), Dtermination of the maximum Density for a 60/40 Ester/Water Ratio PETROFREE mud, Dec. 12, 1994.

Baroid Drilling Fluids, Res. & Eng. & Anal. Serv/Support (TS-1193), Analysis of a PTROFREE LE muds to Determine the Cause of High Viscosities at Cold Temp.,Jan. 30, 1997.

Baroid, A Halliburton COmpany, Res. & Eng. Tech. & Anal. Serv./Support (FS-0082), Field Support for Utilizing 13.0 lb/gal. 75/ PETROFREE SF Drilling Fluid Feb. 4, 2000.
Baroid Drilling Fluids, Res. & Eng. Tech & Anal. Serv./Support Field Service (FS-0058S2) relating to PETROFREE LE Jan. 24, 1997.
Baroid Drilling Fluids, Res. & Eng. Tech. & Anal. Serv./Support (TS-0906), Formulation of an ENVIROMUL and PETROFREE mud weighted with BARACARB, May 9, 1995.
Baroid Drilling Fluids, Res. & Eng. Tech & Anal. Serv./Support (TS-0870) Formulation of a Low Yield Point Mud Jan. 11, 1995.
Baroid Drilling Fluids, Res. & Eng. Tech & Anal. Serv./Support (TS-0494), A 15 lb/gal PETROFREE formulation Nov. 22, 1991.
Baroid Drilling Fluids, Res. & Eng. Tech & Anal. Serv./Support (TS-0485), 300 F Static Aging Evaluation of PETROFREE vs ENVIROMUL Nov. 6, 1991.
Baroid Drilling Fluids, Res. & Eng. Tech & Anal. Serv./Support, Field Serv. Report Dec. 2, 1996 to Dec. 16, 1996 (FS-0058S1), Feb. 11, 1997.
Baroid, A Halliburton Company, Test of a PETROFREE LV Mud Sample, Well 0CS-G 14205 #5, Jul. 10, 2000.
Baroid Drilling Fluids, Res. & Eng. Tech & Anal. Serv./Support (FS-0080) Field Support . . . Utilizing an 11/2 lb/gal PETROFREE IO Drilling Fluid Dec. 29, 1999.
Baroid, A Halliburton Company, Internal Memorandum, Report No. FM-0700, Project No. Q3854, Extended Gel Strengths for a Low Viscosity Ester and a PETROFREE mud Nov. 11, 1999.
Baroid Drilling Fluids, Res. & Eng. Tech. & Anal. Serv/Support (EMB-5696), Adjustment of a Stored PETROFREE mud to meet Specification Required, Oct. 6, 1995.
Westport Technology Center Internatinal, Drilling Fluids, and Cement, Analysis of a Baroid PETROFREE Synthetic Mud, WTCI-94-133, Nov. 1994.
MI VERSAMUL Multi-purpose emulsifier Product Bulletin (2pages) 1996.
MI Versathin deflocculant Product Bulletin (2pages) 1996.
MI Versawet organic sufactant Product Bulletin (2 pages) 1996.
MI Versamod organic gelling agent Product Bulletin (2 pages) 1996.
MI Versapac rheological additive Product Bulletin (2 pages) 1999.
MI Versalig amine-treated lignite filtration control additive Product Bulletin (2 pages) 1997.
MI Versalube lubricant Product Bulletin (2 pages) 1999.
MI Novamod organic gelling agent liquid rheology modifier (2 pages) 1997.
Baroid ADAPTA Copolymer HPHT Filtration Reducer product information sheet (1 page) 2001.
Baroid RHEMOD L modified fatty acid Suspensin Agent/Viscosifier product information sheet (1 page) 2001.
Deposition Transcript of Heinz Mueller in Civ. Action 6:05-CV-155, Halliburton v MI, US Dist Ct. Eastern District of Texas.
Halliburton's Opposition to Defendant's Motion for Summary Judgment of Invalidity in Civ. Action 6:05-cv-155, Halliburton v MI, US Disct. Ct. Eastern Dist. of Texas.
Memorandum and Opinion of Court signed Oct. 18, 2006 in Civ. Action 6:05-cv-155, Halliburton v MI, US Disct. Ct. Eastern Dist. of Texas, granting Motion for Summary Judgment.
U.S. PTO Office action of Nov. 10, 2005 in U.S. Appl. No. 10/656,684.
U.S. PTO Office action of Jul. 21, 2006 in U.S. Appl. No. 10/656,684.
U.S. PTO Office action of Jul. 17, 2006 in U.S. Appl. No. 10/933,560.
U.S. PTO Office action of Jun. 4, 2004 in U.S. Appl. No. 10/175,272.
U.S. PTO Notice of Allowance Dec. 1, 2004 in U.S. Appl. No. 10/175,272.
U.S. PTO Office action of Jun. 27, 2006 in U.S. Appl. No. 10/432,787.
PCT International Search Report in PCT/US00/35609 Corresponding to U.S. Appl. No. 10/432,787.
U.S. PTO Office action of Oct. 4, 2002 in U.S. Appl. No. 09/929,465.

PCT International Preliminary Examination Report in PCT/US00/ 35609 Correpsonding to U.S. Appl. No. 10/432,787.
JA Toups, Jr., Westport Technology Center International, Report of Fann 70 Testing of Nine OBM Drilling Fluid Samples from M-I, Inteq, and Baroid for BP Amoco, Aug. 2001.
M-I Internal Lab Test Report Memorandum to Jim Friedheim from John Lee on Pilot Test of SBM from Crosby, Report # RD000426-JL001, Apr. 26, 2000 (1 page).
Complaint (with Cert. of Serv.)—M-I, LLC v. Halliburton Energy Services, Inc., CV 07-01078, U.S. Dist. Ct., C.D. Cal., with Exh. A-E, Feb. 16, 2007.
Protest by M-I, LLC in U.S. Appl. No. 11/633,703 of Jeff Kirsner, et al., Feb. 16, 2007.
Protest by M-I, LLC in U.S. Appl. No. 11/633,704 of Jeff Kirsner, et al., Feb. 16, 2007.
Protest by M-I, LLC in U.S. Appl. No. 11/633,822 of Jeff Kirsner, et al., Feb. 16, 2007.
Protest by M-I, LLC in U.S. Appl. No. 11/634,008 of Jeff Kirsner, et al., Feb. 16, 2007.
European Office Action (with Attached International Preliminary Examination Report) for EP 03732726.9-2111 dated Jul. 13, 2006 related to US 6,887,832.
Australian Office Action for AU 2001226086 related to U.S. Appl. No. 10/432,786.
Andy Patrickis, et al., Case History: Zero Whole Mud Losses Achieved During Casing and Cementing Operations on Challenging Deep . . . , AADE-04-DF-HO-36, Apr. 6-7, 2004, 8 pages.
Gregory A. Mullen, et al., The Pro's and Con's of Flat Rheology Drilling Fluids, AADE-05-NTCE-28, Apr. 5-7, 2005, 28 pages.
Jim Friedheim, Flat Rheology Mud Shows Promise In Deepwater GOM Trials, 64 (6) Offshore 46, 49-50, 52 (Jun. 1, 2004).
American Petroleum Institute, Recommended Practice Standard Procedure for Field Testing Oil-Based Drilling Fluids, No. 13B-2, 3d ed., Feb. 1998 (58 pages).
API, Recommended Practice Standard Procedure for Field Testing Oil-Based Drilling Fluids, No. 13B-2, 3d ed. Feb. 1998 SUPPLEMENT 1, May 2000 (20 pages).
U.S. Appl. No. 10/432,787 of Mueller et al., filed Feb. 17, 2004, Office Action mailed Apr. 25, 2007 (7 pages).
U.S. Appl. No. 10/292,124 of Kirsner, et al., filed Nov. 12, 2002, Office Action mailed Jan. 12, 2005 (6 pages).
U.S. Appl. No. 10/292,124 of Kirsner, et al., filed Nov. 12, 2002, Office Action mailed Jun. 29, 2005 (7 pages).
U.S. Appl. No. 10/292,124 of Kirsner, et al., filed Nov. 12, 2002, Office Action mailed Sep. 27, 2005 (13 pages).
U.S. Appl. No. 10/292,124 of Kirsner, et al., filed Nov. 12, 2002, Office Action mailed Jul. 17, 2006 (15 pages).
U.S. Appl. No. 10/292,124 of Kirsner, et al., filed Nov. 12, 2002, Interview Summary mailed Sep. 12, 2006 (4 pages).
U.S. Appl. No. 10/292,124 of Kirsner, et al., filed Nov. 12, 2002, Interview Summary mailed Oct. 4, 2006 (5 pages).
U.S. Appl. No. 10/292,124 of Kirsner, et al., filed Nov. 12, 2002, Int. Sum., Amend. & Resp. Under 37 CFR 1.111 to Non-Final Office Action, mailed Oct. 9, 2006, pp. 1-2, 51-66.
U.S. Appl. No. 10/292,124 of Kirsner, et al., filed Nov. 12, 2002, Office Action mailed Apr. 17, 2007 (17 pages).
U.S. Appl. No. 10/292,124 of Kirsner, et al., filed Nov. 12, 2002, Interview Summary signed by K. Tripp, attorney, faxed May 10, 2007 (2 pages).
U.S. Appl. No. 10/292,124 of Kirsner, et al., filed Nov. 12, 2002, Interview Summary mailed May 21, 2007 (4 pages).
U.S. Appl. No. 10/761,552 of Kirsner, et al., filed Jan. 21, 2004, Office Action mailed Feb. 6, 2006(7 pages).
U.S. Appl. No. 10/761,552 of Kirsner, et al., filed Jan. 21, 2004, Office Action mailed Jan. 30, 2007 (10 pages).
U.S. Appl. No. 10/432,786 of Mueller, et al., filed Dec. 10, 2003, Advisory Action mailed Nov. 30, 2006 (5 pages).
U.S. Appl. No. 10/432,786 of Mueller, et al., filed Dec. 10, 2003, Office Action mailed Mar. 7, 2007 (5 pages).
U.S. Appl. No. 10/761,552 of Kirsner, et al., filed Jan. 21, 2004, Office Action mailed May 31, 2006 (6 pages).
U.S. Appl. No. 10/761,552 of Kirsner, et al., filed Jan. 21, 2004, Office Action mailed Feb. 6, 2006 (7 pages).

U.S. Appl. No. 09/929,465 of Kirsner, et al., filed Aug. 14, 2001, Notice of Abandonment, mailed Nov. 9, 2006 (2 pages).
U.S. Appl. No. 09/929,465 of Kirsner, et al., filed Aug. 14, 2001, Notice of Allowance and Fee(s) Due mailed Apr. 11, 2006 (3 pages).
U.S. Appl. No. 09/929,465 of Kirsner, et al., filed Aug. 14, 2001, Notice of Allowability mailed 4/6 or Nov. 2006 (3 pages).
U.S. Appl. No. 09/929,465 of Kirsner, et al., filed Aug. 14, 2001, Office Action mailed Oct. 4, 2002 (9 pages).
U.S. Appl. No. 09/929,465 of Kirsner, et al., filed Aug. 14, 2001, Office Action mailed Jun. 24, 2003 (9 pages).
U.S. Appl. No. 09/929,465 of Kirsner, et al., filed Aug. 14, 2001, Office Action mailed Apr. 16, 2004 (11 pages).
U.S. Appl. No. 09/929,465 of Kirsner, et al., filed Aug. 14, 2001, Office Action mailed Jan. 21, 2005.
U.S. Patent Application No. 9/929,465 of Kirsner, et al., filed Aug. 14, 2001, Office Action mailed Sep. 29, 2005 (10 pages).
U.S. Appl. No. 10/432,786 of Mueller, et al., filed Dec. 10, 2003, Office Action mailed Sep. 15, 2006 (5 pages).
U.S. Appl. No. 10/432,786 of Mueller, et al., filed Dec. 10, 2003, Office Action mailed Dec. 28, 2005 (7 pages).
Baroid Drilling Fluids PETROFREE Biodegradable Solution for High-Performance Drilling Product Brochure 1992 (8 pages).
Baroid, A Halliburton Co., R&E Tech. & Analytical Services/Support Field support for OCS-G 18273, MC 705 #1 Report using PETROFREE SF Drilling Fluid,Feb. 4, 2000 (7 pages).
Mac Seheult, et al., Biopolymer Fluids Eleiminate Horizontal Well Problems, World Oil, Jan. 1990, pp. 49-53.
Bob Byrd, et al., Fluids Are Key In Drilling Highly Deviated Wells, Petroleum Engineering Int'l, Feb. 1988 pp. 24-26.
Chapter 13, Synthetics, Baroid Fluids Handbook, Rev. Aug. 1, 1997 (27 pages).
David Power, et al., Flat Rheology SBM Shows Promise in Deepwater, Drilling Contractor, May/Jun. 2003, pp. 44-45.
Synthetic-Base Fluid Reduces Downhole Losses, Hart's E&P Spe. Merit. Award for Eng. Innov., Judges Choose Top 14 Indus. Proj., www.EandPnet.com, Hart's E&P, Apr. 2003 (10 pp).
Baroid Industrial Drilling Products BIO-BORE Horizontal Directional Drilling Fluid Concentrate, Product Data Sheet, 1995 (1 page).
Baroid Drilling Fluids, Res. & Eng. Tech. & Analytical Services/Support Field Service Report (FS-0058) Nov. 14-Dec. 3, 1996 using PETROFREE LE (18 pp).
Baroid, a Halliburton Co., Res. & Eng. Tech. & Analytical Services/Support Field Support Report (FS-0080) Dec. 29, 1999, using PETROFREE IO (2pp).
PCT International Preliminary Examination Report for PCT/US0035610 (corresponding to U.S. Appl. No. 10/432,786), completed Jul. 8, 2003 (4 pages).
EPO Examination Report for European Patent Application No. 00 989 596.2 corresponding to U.S. Appl. No. 10/432,787, dated Feb. 10, 2006 (5 pages).
EPO Examination Report for European Patent Application No. 00 989 597.0 corresponding to U.S. Appl. No. 10/432,786, dated Apr. 20, 2006 (4 pages).
ALFONIC alcohol Ethoxylates from Low Range Alcohols C6-C10 product technical data sheet, Sasol North America, Inc., dated Jan. 2003 (3 pages).
PCT International Search Report for PCT/US0035609 (corresponding to U.S. Appl. No. 10/432,787), dated Mar. 28, 2001 (5 pages).
PCT International Search Report for PCT/US00/35610 (corresponding to U.S. Appl. No. 10/432,786), dated Aug. 8, 2001 (5 pages).
Brief of Plaintiff-Appellant Halliburton in Halliburton v. MI, Case No. 2007-1149, before the Federal Circuit, concerning US Patent No. 6,887,832, filed Apr. 25, 2007,143 pp.
Brief of Defendant-Appellee MI in Halliburton v. MI, Case No. 2007-1149, before the Federal Circuit, concerning US Patent No. 6,887,832, filed 23, 2007,64 pp.
N. Hands, et al., "Optimising Inflow Performance of a Long Multi-Lateral Offshore Well in Low Permeability, Gas Bearing Sandstone:K14-FB 102 . . . ," SPE 50394, Nov. 14, 1998 (14 pp).
ALFONIC Alcohol Ethoxylates from Low Range Alcohols C6-C10 Technical Data Sheet, Sasol North America Inc., Rev. Jan. 2003 (3 pages), previously available at www.condea.de.
P.A. Boyd, D.L. Whitfill, T.S. Carter, & J. P. Allamon, New Base Oil Used in Low-Toxicity Oil Muds, SPE 12119, J. Petroleum Tech., pp. 137-142+4 unnumbered pages (Jan. 1985).
BIO-BORE (TM) Horizontal Directional Drilling Fluid Concentrate, Product Data Sheet, Baroid Indus. Drilling Products, 1995 (month of publication not known).
Juan Carlos Rojas, et al., Increased Deepwater Drilling Performance Using Constant Rheology Synthetic-based Mud, AADE-07-NTCE-20, Apr. 10-12, 2007, 9 pages.
Corrected Reply Brief of Plaintiff-Appellant Halliburton in Appeal to Federal Circuit, No. 2007-1149, Halliburton v. M-I, filed Jul. 26, 2007 (40 pages).

* cited by examiner

METHOD OF FORMULATING AND USING A DRILLING MUD WITH FRAGILE GELS

RELATED APPLICATIONS

This application is a continuation of U.S. patent application Ser. No. 10/175,272, filed Jun. 19, 2002, now U.S. Pat. No. 6,887,832, which is a continuation-in-part of U.S. patent application Ser. No. 09/929,465, filed Aug. 14, 2001, now abandoned, and a continuation-in-part of International Patent Application Nos. PCT/US00/35609 and PCT/US00/35610, both filed Dec. 29, 2000, under the Patent Cooperation Treaty, and now both pending in national phase in the United States respectively as U.S. patent application Ser. Nos. 10/432,787 and 10/432,786.

BACKGROUND OF THE INVENTION

1. Field of the Invention

The present invention relates to compositions and methods for drilling, cementing and casing boreholes in subterranean formations, particularly hydrocarbon bearing formations. More particularly, the present invention relates to oil or synthetic fluid based drilling fluids and fluids comprising invert emulsions, such as, for example, fluids using esters, which combine high ecological compatibility with good stability and performance properties.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic fluid-based muds are normally used to drill swelling or sloughing shales, salt, gypsum, anhydrite or other evaporite formations, hydrogen sulfide-containing formations, and hot (greater than about 300 degrees Fahrenheit) holes, but may be used in other holes penetrating a subterranean formation as well. Unless indicated otherwise, the terms "oil mud" or "oil-based mud or drilling fluid" shall be understood to include synthetic oils or other synthetic fluids as well as natural or traditional oils, and such oils shall be understood to comprise invert emulsions.

Oil-based muds used in drilling typically comprise: a base oil (or synthetic fluid) comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. Such additives commonly include organophilic clays and organophilic lignites. See H. C. H. Darley and George R. Gray, Composition and Properties of Drilling and Completion Fluids 66-67, 561-562 (5$^{th}$ ed. 1988). An oil-based or invert emulsion-based drilling fluid may commonly comprise between about 50:50 to about 95:5 by volume oil phase to water phase. An all oil mud simply comprises 100% oil by volume; that is, there is no aqueous internal phase.

Invert emulsion-based muds or drilling fluids comprise a key segment of the drilling fluids industry. However, increasingly invert emulsion-based drilling fluids have been subjected to greater environmental restrictions and performance and cost demands. There is consequently an increasing need and industry-wide interest in new drilling fluids that provide improved performance while still affording environmental acceptance.

SUMMARY OF THE INVENTION

The present invention provides a fluid and a method for drilling boreholes or wellbores in subterranean formations with reduced loss of drilling fluids or muds into the formation. This advantage of the invention is effected by formulating, providing or using a drilling fluid that forms a "fragile gel." A "gel" may be defined a number of ways. One definition indicates that a "gel" is a generally colloidal suspension or a mixture of microscopic water particles (and any hydrophilic additives) approximately uniformly dispersed through the oil (and any hydrophobic additives), such that the fluid or gel has a generally homogeneous gelatinous consistency. Another definition states that a "gel" is a colloid in a more solid form than a "sol" and defines a "sol" as a fluid colloidal system, especially one in which the continuous phase is a liquid. Still another definition provides that a "gel" is a colloid in which the disperse phase has combined with the continuous phase to produce a viscous jelly-like product. A gel has a structure that is continually building. If the yield stress of a fluid increases over time, the fluid has gels. Yield stress is the stress required to be exerted to initiate deformation.

A "fragile gel" as used herein is a "gel" that is easily disrupted or thinned, and that liquifies or becomes less gel-like and more liquid-like under stress, such as caused by moving the fluid, but which quickly returns to a gel when the movement or other stress is alleviated or removed, such as when circulation of the fluid is stopped, as for example when drilling is stopped. The "fragileness" of the "fragile gels" of the present invention contributes to the unique and surprising behavior and advantages of the present invention. The gels are so "fragile" that it is believed that they may be disrupted by a mere pressure wave or a compression wave during drilling. They seem to break instantaneously when disturbed, reversing from a gel back into a liquid form with minimum pressure, force and time and with less pressure, force and time than known to be required to convert prior art fluids from a gel-like state into a flowable state.

When drilling is stopped while using a drilling fluid of the present invention, and consequently the stresses or forces associated with drilling are substantially reduced or removed, the drilling fluid forms a gel structure that allows it to suspend drill cuttings and weighting materials for delivery to the well surface. The drilling fluid of the invention suspends drill cuttings through its gel or gel-like characteristics, without need for organophilic clays to add viscosity to the fluid. As a result, sag problems do not occur. Nevertheless, when drilling is resumed, the fragile gel is so easily and instantly converted back into a liquid or flowable state that no initial appreciable or noticeable pressure spike is observed with pressure-while-drilling (PWD) equipment or instruments. In contrast, such pressure spikes are commonly or normally seen when using prior art fluids.

Further, the drilling fluid of the invention generally maintains consistently low values for the difference in its surface density and its equivalent density downhole during drilling operations notwithstanding variations in the rate of drilling or penetration into the subterranean formation and notwithstanding other downhole stresses on the fluid. The fragile gels of the invention may be visco-elastic, contributing to their unique behavior and to the advantages of the invention.

The drilling fluid of the invention responds quickly to the addition of thinners, with thinning of the fluid occurring soon after the thinners are added, without need for multiple circulations of the fluid with the thinners additive or additives in the wellbore to show the effect of the addition of the thinners. The drilling fluid of the invention also yields flatter profiles between cold water and downhole rheologies, making the fluid advantageous for use in deep water wells. That is, the fluid may be thinned at cold temperatures without causing the fluid to be comparably thinned at higher temperatures. As used herein, the terms "deep water" with respect to wells and "higher" and "lower" with respect to temperature are relative terms understood by one skilled in the art of the oil and gas industry. However, generally, as used herein, "deep water wells" refers to any wells at water depths greater than about 1500 feet deep, "higher temperatures" means temperatures over about 120 degrees Fahrenheit and "lower temperatures" means temperatures at about 40 to about 60 degrees Fahrenheit. Rheology of a drilling fluid is typically measured at about 120 or about 150 degrees Fahrenheit.

A method for preparing and using a drilling fluid of the invention is also provided by the invention. In the method, an invert emulsion drilling fluid is obtained or prepared that forms fragile gels or that has fragile gel behavior, preferably without the addition of organophilic clays or organophilic lignites, and that has as its base an invert emulsion composition. An example of a suitable base is a blend of esters with isomerized, or internal, olefins ("the ester blend") as described in U.S. patent application Ser. No. 09/929,465, of Jeff Kirsner (co-inventor of the present invention), Kenneth W. Pober and Robert W. Pike, filed Aug. 14, 2001, entitled "Blends of Esters with Isomerized Olefins and Other Hydrocarbons as Base Oils for Invert Emulsion Oil Muds, incorporated herein by reference.

Drilling fluids of the present invention prepared with such ester blends provide an invert emulsion drilling fluid having significant benefits in terms of environmental acceptance or regulatory compliance while also improving oil mud rheology and overall oil mud performance. The esters in the blend may be any quantity, but preferably should comprise at least about 10 weight percent to about 99 weight percent of the blend and the olefins should preferably comprise about 1 weight percent to about 99 weight percent of the blend. The esters of the blend are preferably comprised of fatty acids and alcohols and most preferably about $C_6$ to about $C_{14}$ fatty acids and 2-ethyl hexanol. Esters made other ways than with fatty acids and alcohols, such as for example, esters made from olefins combined with either fatty acids or alcohols, are also believed effective.

Further, the invert emulsion drilling fluid has added to or mixed with it other fluids or materials needed to comprise a complete drilling fluid. Such materials may include thinners or rheology control additives for example. However, preferably no organophilic clays are added to the drilling fluid for use in the invention. Characterization of the drilling fluid herein as "clayless" shall be understood to mean lacking organophilic clays. Although omission of organophilic clays is a radical departure from traditional teachings respecting preparation of drilling fluids, this omission of organophilic clays in the present invention allows the drilling fluid to have greater tolerance to drill solids (i.e., the properties of the fluid are not readily altered by the drill solids or cuttings) and is believed (without desiring to be limited by theory) to contribute to the fluid's superior properties in use as a drilling fluid.

BRIEF DESCRIPTION OF THE DRAWINGS

FIG. 1(a) shows the total downhole losses; FIG. 1(b) shows the barrels lost per barrel of hole drilled; and FIG. 1(c) shows the barrels lost per foot.

DETAILED DESCRIPTION OF PREFERRED EMBODIMENTS

Figure 1A:
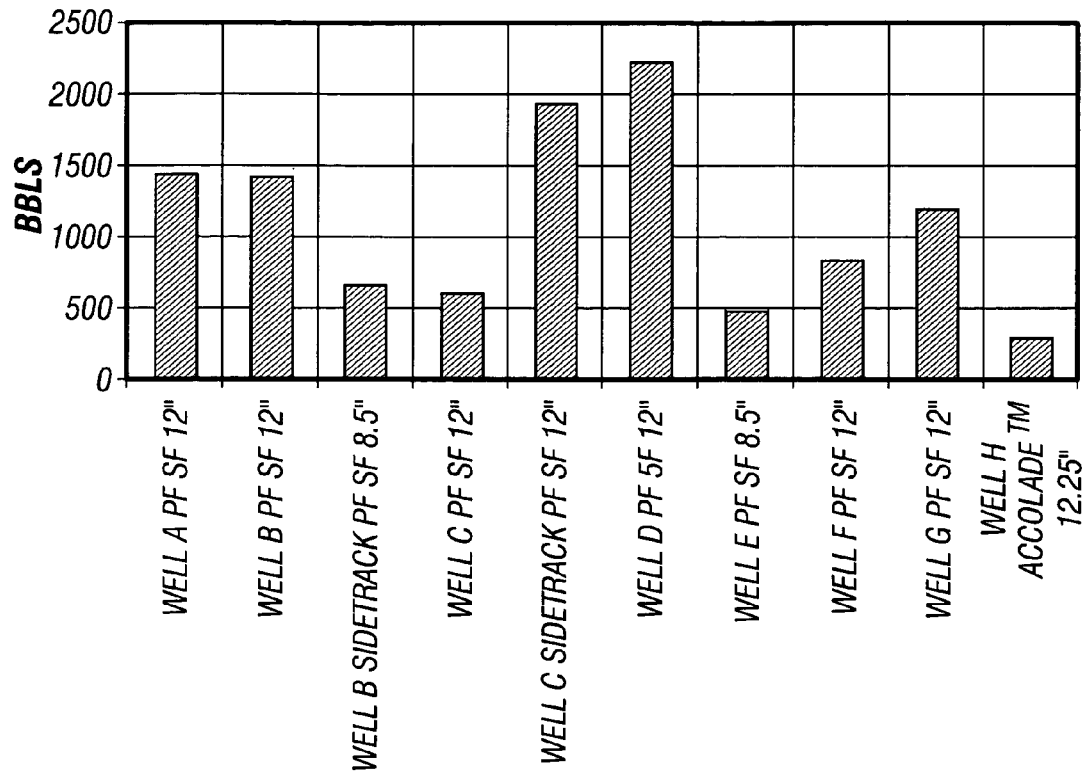
FIGS. 1(a), 1(b) and 1(c) provide three graphs showing field data comparing mud losses incurred during drilling, running casing and cementing with a prior art isomerized olefin fluid and with a fluid of the present invention.

The present invention has been tested in the field and the field data demonstrates the advantageous performance of the fluid composition of the invention and the method of using it. As illustrated in FIGS. 1(a), (b), (c), and 2, the present invention provides an invert emulsion drilling fluid that may be used in drilling boreholes or wellbores in subterranean formations, and in other drilling operations in such formations (such as in casing and cementing wells), without significant loss of drilling fluid when compared to drilling operations with prior art fluids.

Figure 1B:
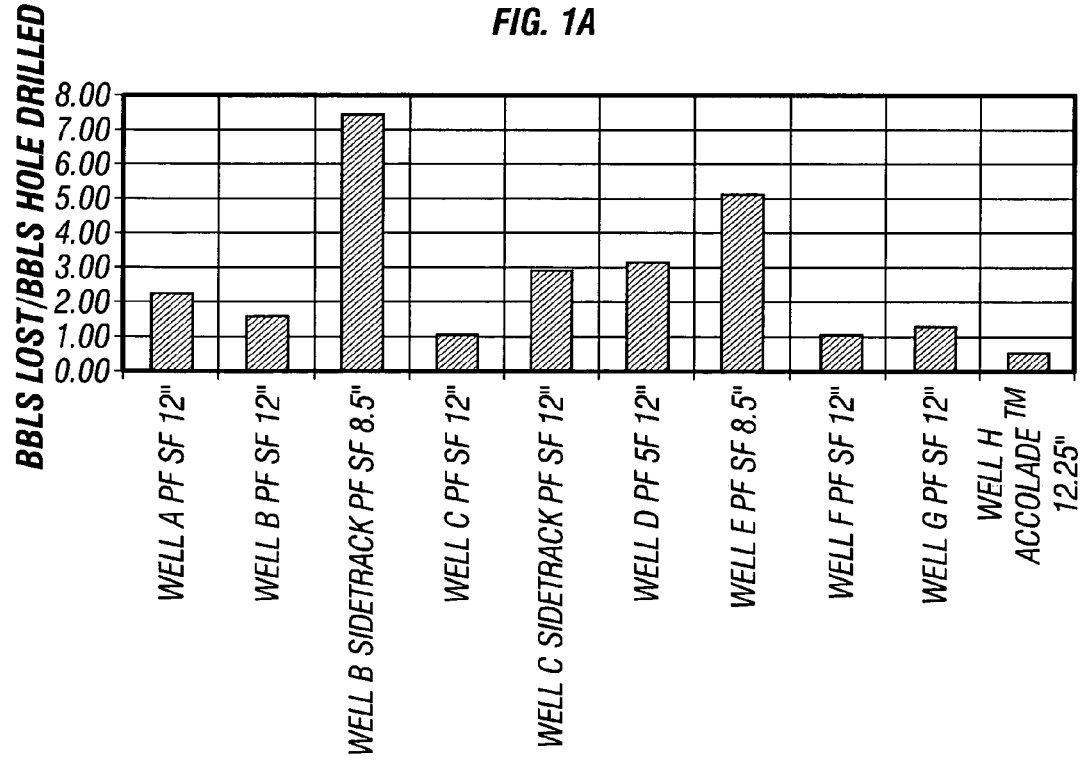
Figure 1C:
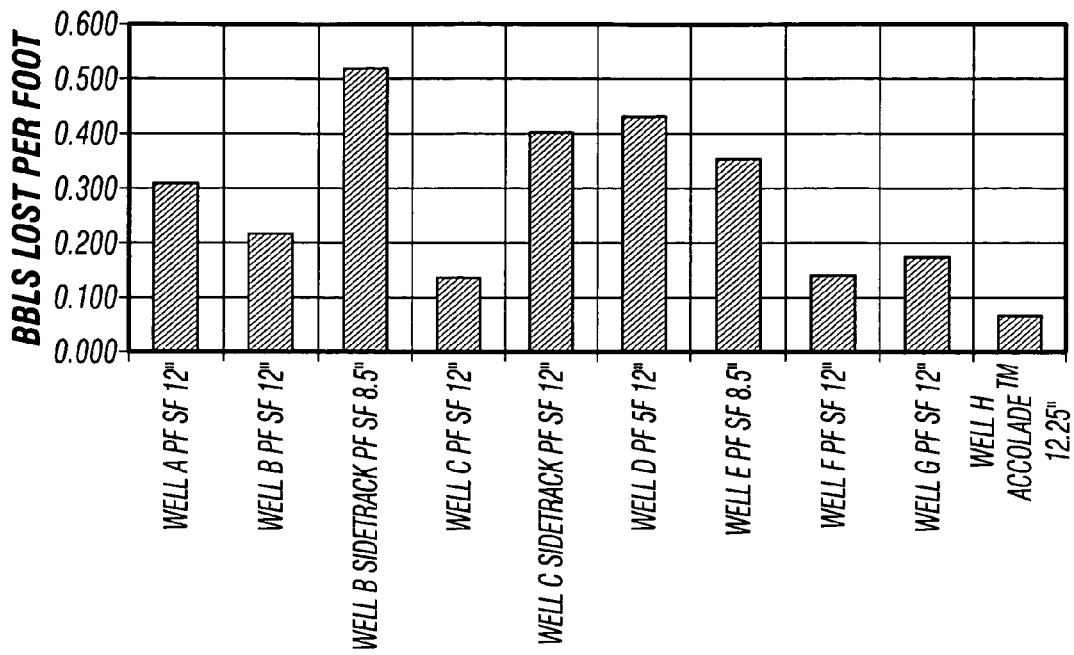

FIGS. 1(a), (b), and (c) show three graphs comparing the actual fluid loss experienced in drilling 10 wells in the same subterranean formation. In nine of the wells, an isomerized olefin based fluid (in this case, tradename PETROFREE® SF available from Halliburton Energy Services, Inc. in Houston, Tex.), viewed as an industry "standard" for full compliance with current environmental regulations, was used. In one well, an ACCOLADE™ system, a fluid having the features or characteristics of the invention and commercially available from Halliburton Energy Services, Inc. in Houston, Tex. (and also fully complying with current environmental regulations) was used. The hole drilled with an ACCOLADE™ system was 12.25 inches in diameter. The holes drilled with the "standard" PETROFREE® SF fluid were about 12 inches in diameter with the exception of two sidetrack holes that were about 8.5 inches in diameter. FIG. 1(a) shows the total number of barrels of fluid lost in drilling, running, casing and cementing the holes. FIG. 1(b) shows the total number of barrels of fluid lost per barrel of hole drilled. FIG. 1(c) shows the total number of barrels of fluid lost per foot of well drilled, cased or cemented. For each of these wells graphed in these FIGS. 1 (a), (b) and (c), the drilling fluid (or mud) lost when using a fluid of the invention was remarkably lower than when using the prior art fluid.

Figure 2:
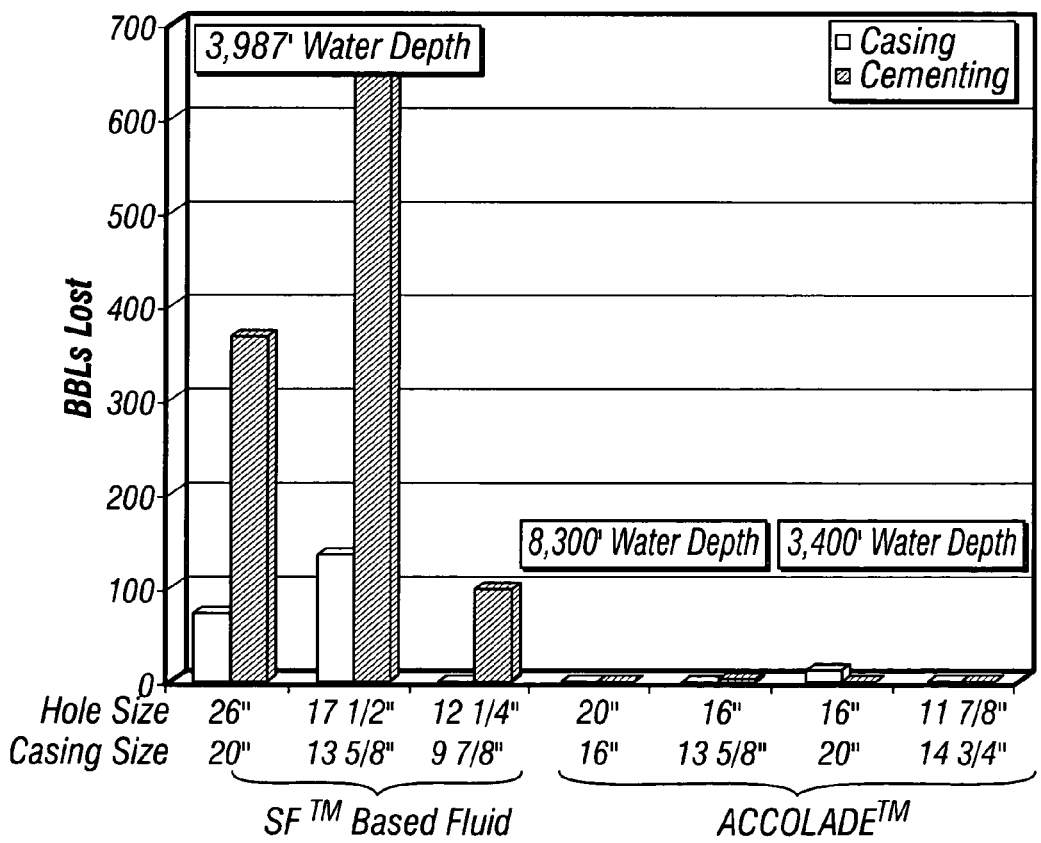
FIG. 2 is a graph comparing mud loss incurred running casing and cementing in seven boreholes at various depths, where the mud used in the first three holes was a prior art isomerized olefin fluid and the mud used in the last four holes was a fluid of the present invention.

FIG. 2 compares the loss of mud with the two drilling fluids in running casing and cementing at different well depths in the same subterranean formation. The prior art isomerized olefin based fluid was used in the first three wells shown on the bar chart and a fluid of the present invention was used in the next four wells shown on the bar chart. Again, the reduction in loss of fluid when using the fluid of the present invention was remarkable.

The significant reduction in mud loss seen with the present invention is believed to be due at least in substantial part to the fragile gel behavior of the fluid of the present invention and to the chemical structure of the fluid that contributes to, causes, or results in that fragile gel behavior. According to the present invention, fluids having fragile gels or fragile gel behavior provide significant reduction in mud loss during drilling (and casing and cementing) operations when compared to mud losses incurred with other drilling fluids that do not have fragile gel behavior. Without wishing to be limited by theory, it is believed, for example, that the structure of the drilling fluids of the invention, that is, the fragile gel structure, contributing to the fragile gel behavior results in lower surge and swab pressure while running casing which in turn results in lower mud loss during such casing operations. Thus, according to the method of the invention, drilling fluid loss may be reduced by employing a drilling fluid in drilling operations that is formulated to comprise fragile gels or to exhibit fragile gel behavior. As used herein, the term "drilling operations" shall mean drilling, running casing and/or cementing unless indicated otherwise.

Figure 3:
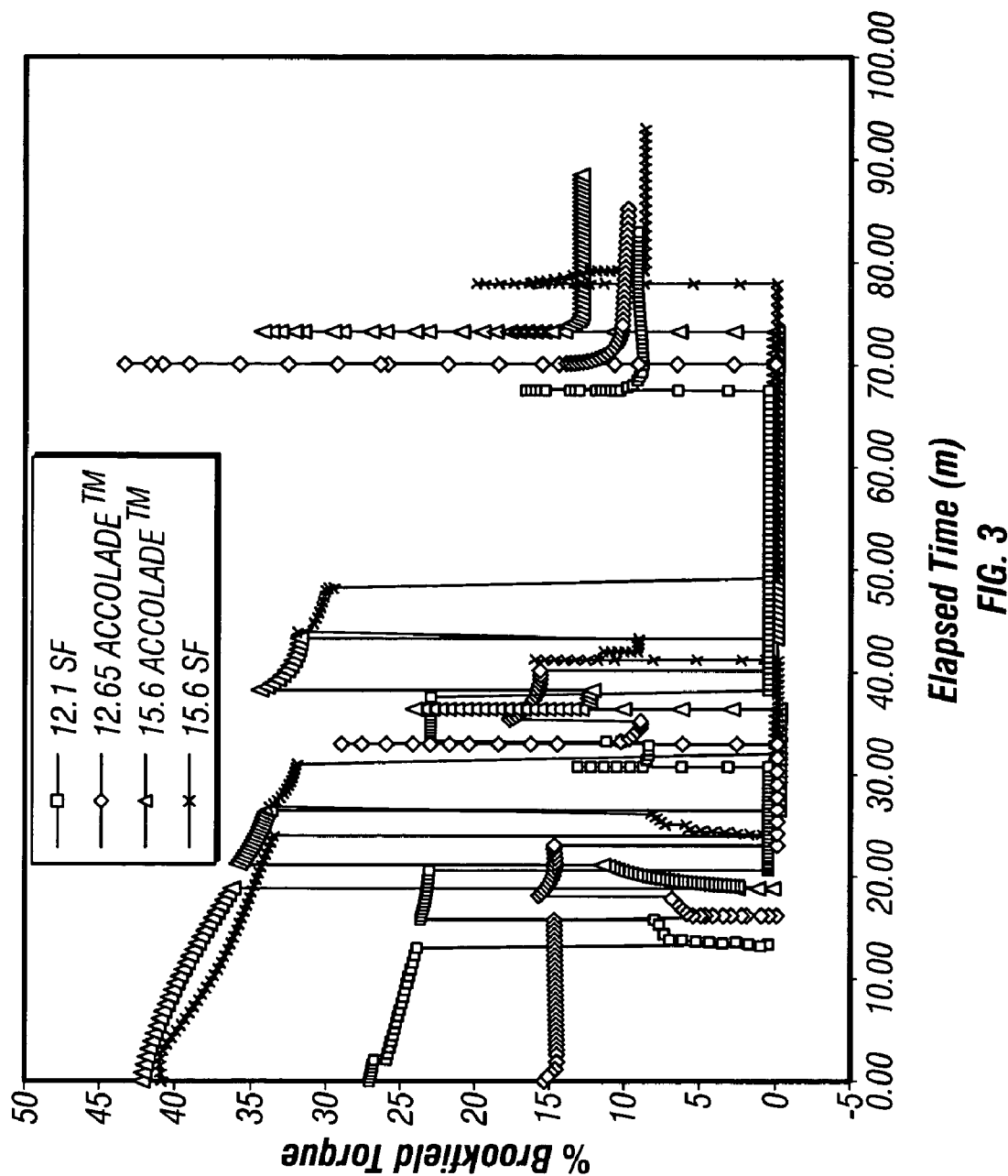
FIG. 3 is a graph indicating gel formation in fluids of the present invention and their response when disrupted compared to some prior art isomerized olefin fluids.

FIG. 3 represents in graphical form data indicating gel formation in samples of two different weight (12.65 and 15.6 ppg) ACCOLADE® fluids of the present invention and two comparably weighted (12.1 and 15.6 ppg) prior art invert emulsion fluids (tradename PETROFREE® SF) at 120 degrees Fahrenheit. When the fluids are at rest or static (as when drilling has stopped in the wellbore), the curves are flat or relatively flat (see area at about 50-65 minutes elapsed time for example). When shear stress is resumed (as in drilling), the curves move up straight vertically or generally vertically (see area at about 68 to about 80 elapsed minutes for example), with the height of the curve being proportional to the amount of gel formed—the higher the curve the more gel built up. The curves then fall down and level out or begin to level out, with the faster rate at which the horizontal line forms (and the closer the horizontal line approximates true horizontal) indicating the lesser resistance of the fluid to the stress and the lower the pressure required to move the fluid.

FIG. 3 indicates superior response and performance by the drilling fluids of the present invention. Not only do the fluids of the present invention build up more gel when at rest, which enables the fluids of the invention to better maintain weight materials and drill cuttings in suspension when at rest—a time prior art fluids are more likely to have difficulty suspending such solid materials—but the fluids of the present invention nevertheless surprisingly provide less resistance to the sheer, which will result in lower ECDs as will be discussed further below.

Figure 4:
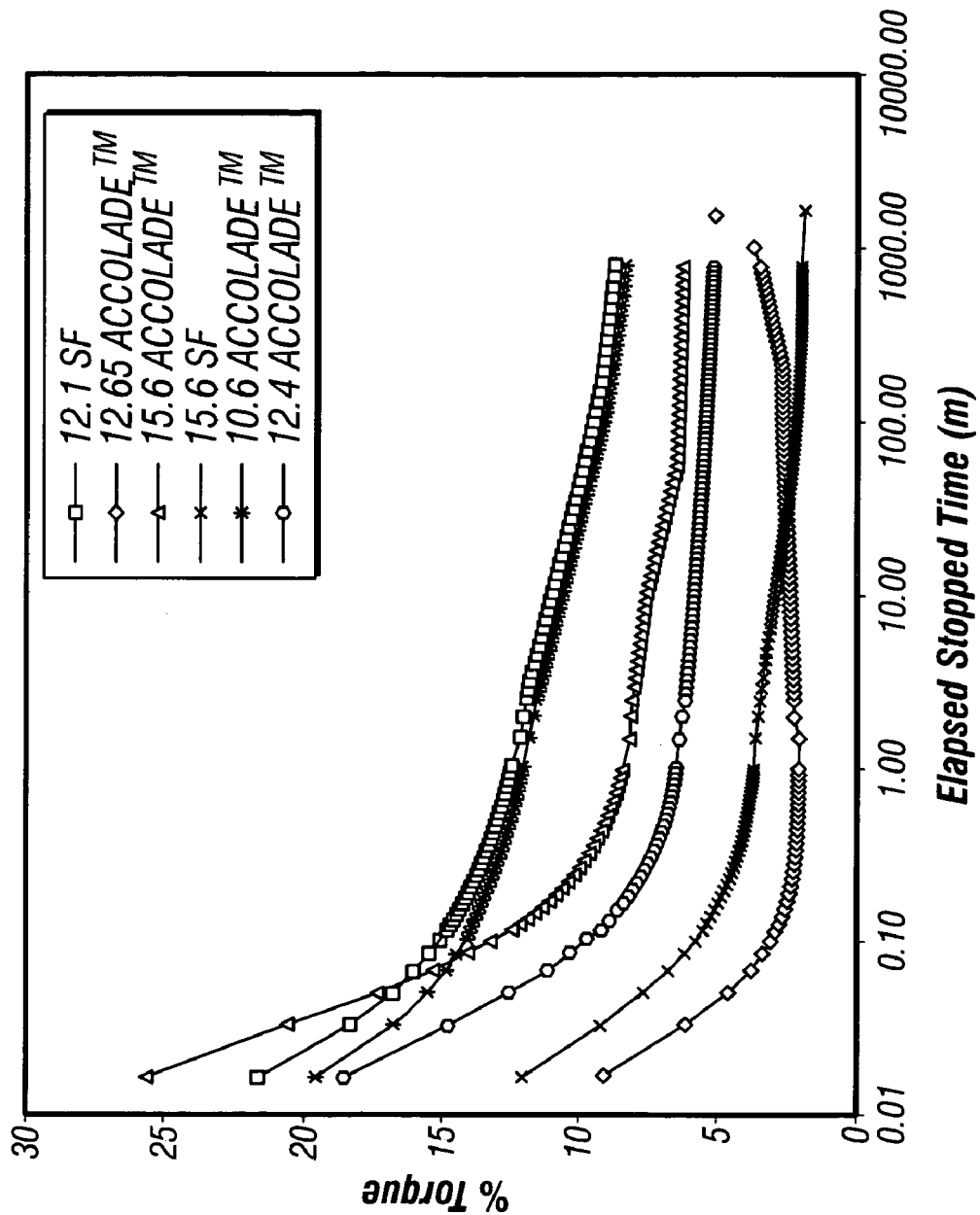
FIG. 4 is a graph comparing the relaxation rates of various prior art drilling fluids and fluids of the present invention.

FIG. 4 provides data further showing the gel or gel-like behavior of the fluids of the present invention. FIG. 4 is a graph of the relaxation rates of various drilling fluids, including fluids of the present invention and prior art isomerized olefin based fluids. In the test, conducted at 120 degrees Fahrenheit, the fluids are exposed to stress and then the stress is removed. The time required for the fluids to relax or to return to their pre-stressed state is recorded. The curves for the fluids of the invention seem to level out over time whereas the prior art fluids continue to decline. The leveling out of the curves are believed to indicate that the fluids are returning to a true gel or gel-like structure.

The significant reduction in mud loss seen with the present invention is also believed to be due in substantial part to the suspected viscoelasticity of the fluid of the present invention. Such viscoelasticity, along with the fragile gel behavior, is believed to enable the fluid of the invention to minimize the difference in its density at the surface and its equivalent circulating density downhole. This difference in a drilling fluid's measured surface density at the well head and the drilling fluid's equivalent circulating density downhole (as typically measured during drilling by downhole pressure-while-drilling (PWD) equipment) is often called "ECD" in the industry. Low "ECDs", that is, a minimal difference in surface and downhole equivalent circulating densities, is critical in drilling deep water wells and other wells where the differences in subterranean formation pore pressures and fracture gradients are small.

Figure 5A:
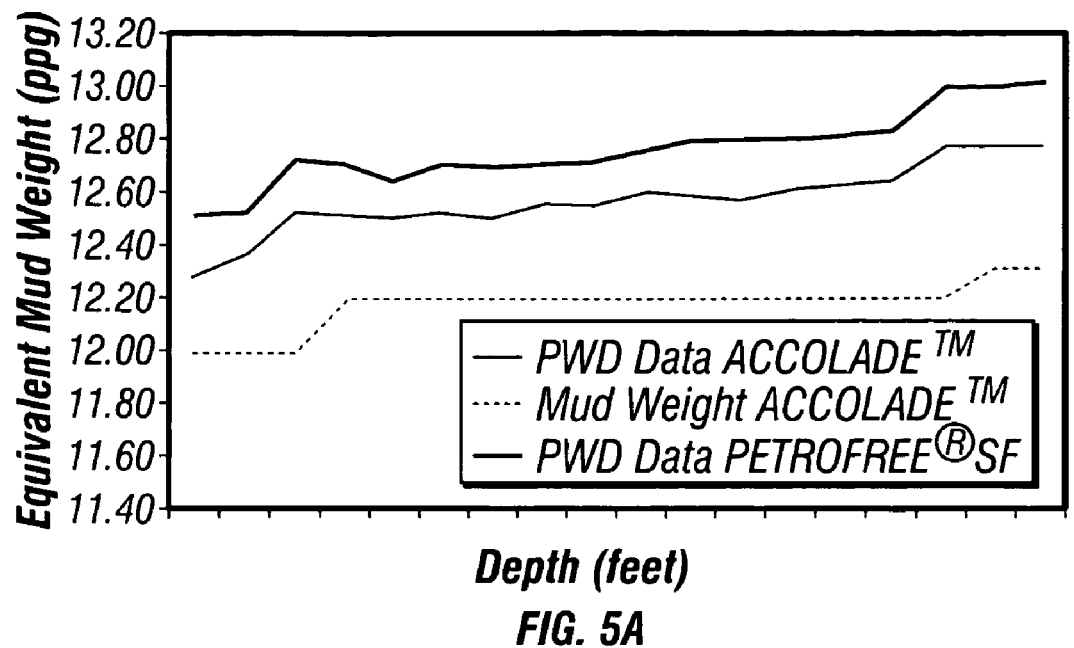
FIG. 5(a) is a graph comparing the differences in well surface density and the equivalent circulating density for a prior art isomerized olefin fluid and for the fluid of the invention in two comparable wells.
Figure 5B:
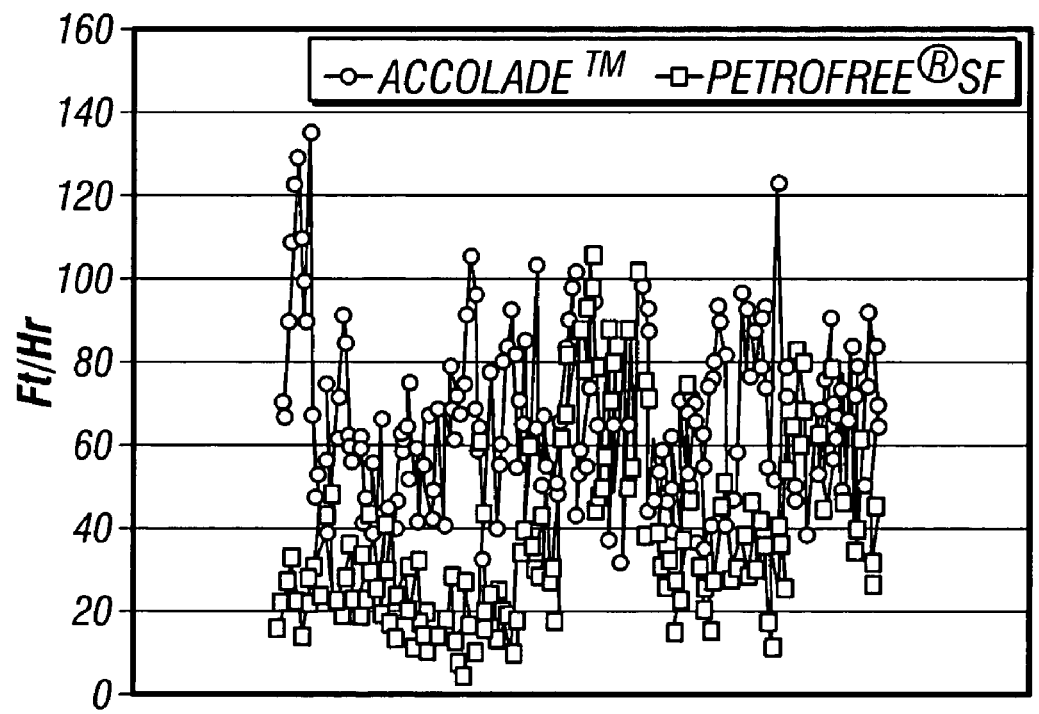
FIG. 5(b) shows the rate of penetration in the wells at the time the density measurements for FIG. 5(a) were being taken.

Table 1 below and FIG. 5(a) showing the Table 1 data in graph form illustrate the consistently stable and relatively minimal difference in equivalent circulating density and actual mud weight or well surface density for the fluids of the invention. This minimal difference is further illustrated in FIG. 5(a) and in Table 1 by showing the equivalent circulating density downhole for a commercially available isomerized olefin drilling fluid in comparison to the drilling fluid of the present invention. Both fluids had the same well surface density. The difference in equivalent circulating density and well surface density for the prior art fluid however was consistently greater than such difference for the fluid of the invention. FIG. 5(b) provides the rates of penetration or drilling rates at the time the measurements graphed in FIG. 5(a) were made. FIG. 5(b) indicates that the fluid of the invention provided its superior performance—low ECDs—at surprisingly faster drilling rates, making its performance even more impressive, as faster drilling rates tend to increase ECDs with prior art fluids.

TABLE 1

Comparison of Equivalent Circulating Densities

| DEPTH (in feet) | PWD Data ACCOLADE ™ System pump rate: 934 gpm BIT: 12.25" (ppg) | Mud Weight At well surface (ppg) | PWD Data Isomerized Olefin based fluid pump rate: 936 gpm BIT: 12.25" (ppg) |
|---|---|---|---|
| 10600 | 12.29 | 12.0 | 12.51 |
| 10704 | 12.37 | 12.0 | 12.53 |
| 10798 | 12.52 | 12.0 | 12.72 |
| 10,899 | 12.50 | 12.2 | 12.70 |
| 11,001 | 12.50 | 12.2 | 12.64 |
| 11,105 | 12.52 | 12.2 | 12.70 |
| 11,200 | 12.50 | 12.2 | 12.69 |
| 11,301 | 12.55 | 12.2 | 12.70 |
| 11,400 | 12.55 | 12.2 | 12.71 |
| 11,500 | 12.59 | 12.2 | 12.77 |
| 11,604 | 12.59 | 12.2 | 12.79 |
| 11,700 | 12.57 | 12.2 | 12.79 |
| 11,802 | 12.60 | 12.2 | 12.79 |
| 11,902 | 12.62 | 12.2 | 12.81 |
| 12,000 | 12.64 | 12.2 | 12.83 |
| 12,101 | 12.77 | 12.2 | 12.99 |

TABLE 1-continued

Comparison of Equivalent Circulating Densities

| DEPTH (in feet) | PWD Data ACCOLADE ™ System pump rate: 934 gpm BIT: 12.25" (ppg) | Mud Weight At well surface (ppg) | PWD Data Isomerized Olefin based fluid pump rate: 936 gpm BIT: 12.25" (ppg) |
|---|---|---|---|
| 12,200 | 12.77 | 12.3 | 12.99 |
| 12,301 | 12.76 | 12.3 | 13.01 |

Figure 6:
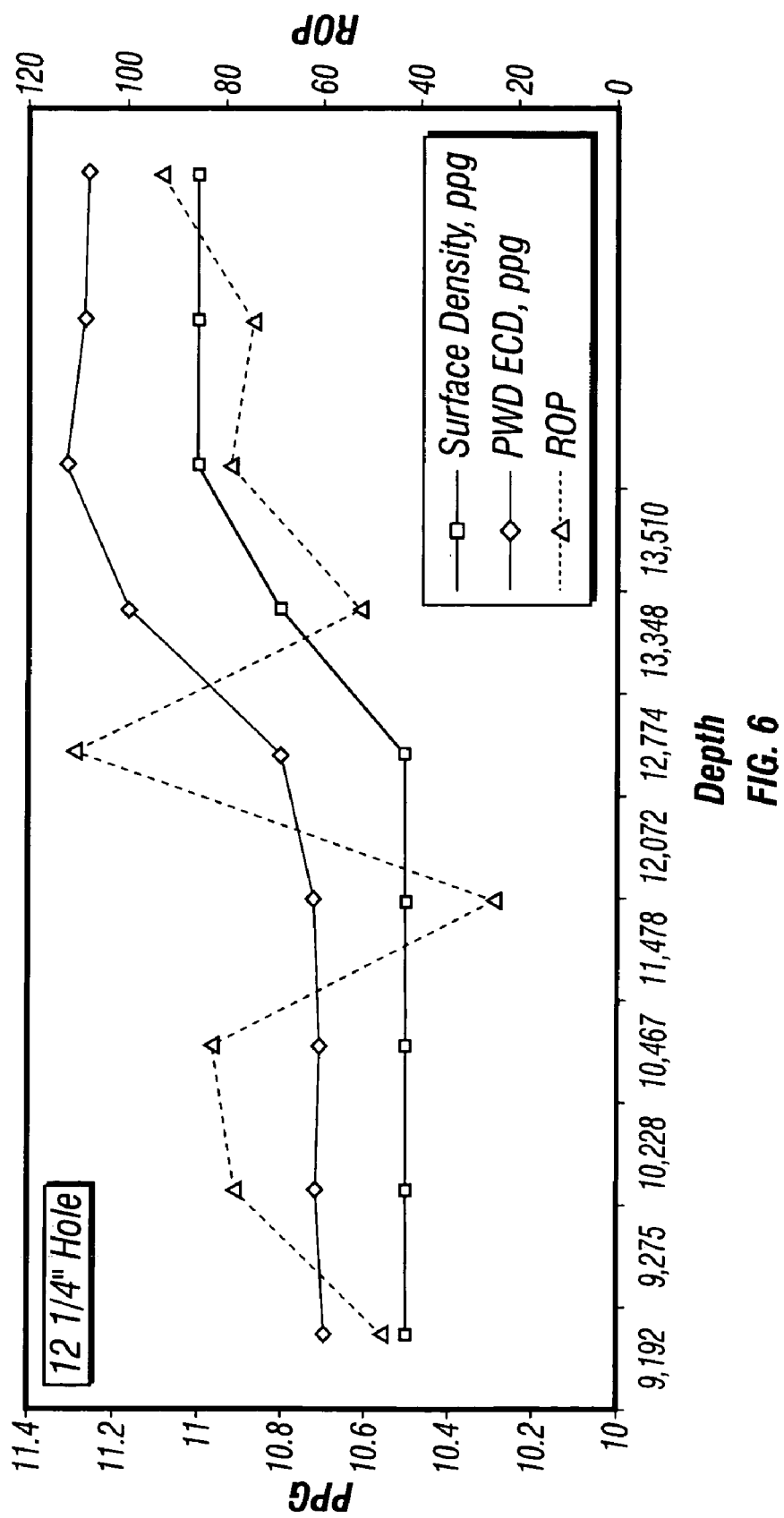
FIG. 6 is a graph comparing the differences in well surface density and the equivalent circulating density for a fluid of the invention with a flowrate of 704 to 811 gallons per minute in a 12¼ inch borehole drilled from 9,192 ft to 13,510 ft in deep water and including rate of penetration.

FIG. 6 graphs the equivalent circulating density of an ACCOLADE™ system, as measured downhole during drilling of a 12¼ inch borehole from 9,192 feet to 13,510 feet in deepwater (4,900 feet), pumping at 704 to 811 gallons per minute, and compares it to the fluid's surface density. Rate of penetration ("ROP")(or drilling rate) is also shown. This data further shows the consistently low and stable ECDs for the fluid, notwithstanding differences in the drilling rate and consequently the differences in stresses on the fluid.

Figure 7:
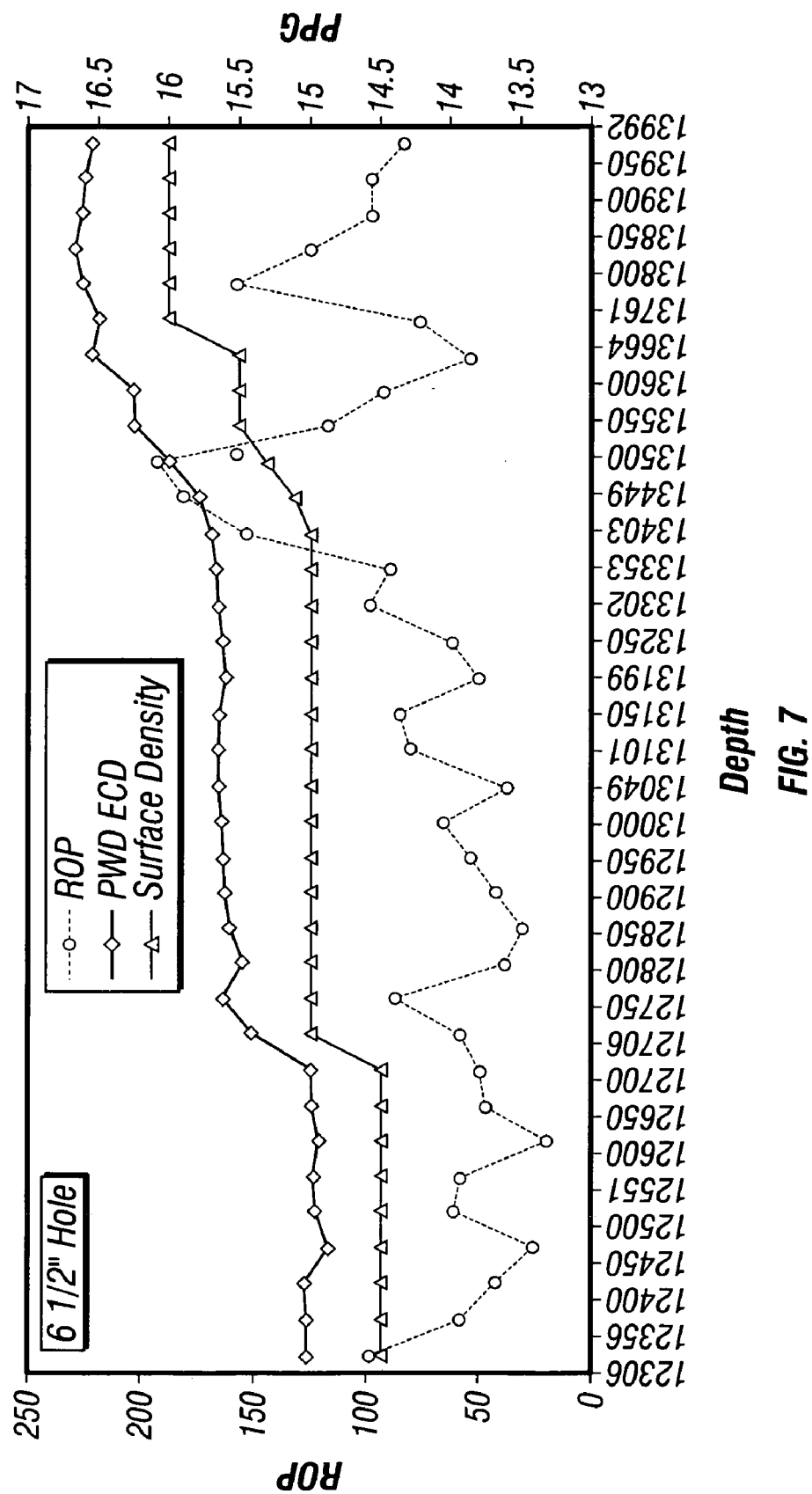
FIG. 7 is a graph comparing the differences in well surface density and the equivalent circulating density for a fluid of the invention with a flowrate of 158 to 174 gallons per minute in a 6½ inch borehole drilled from 12,306 ft to 13,992 ft and including rate of penetration.

FIG. 7 similarly graphs the equivalent circulating density of an ACCOLADE™ system, as measured downhole during drilling of a 6½ inch borehole from 12,306 feet to 13,992 feet, pumping at 158 to 174 gallons per minute in deepwater, and compares it to the fluid's surface density. Rate of penetration (or drilling rate) is also shown. Despite the relatively erratic drilling rate for this well, the ECDs for the drilling fluid were minimal, consistent, and stable. Comparing FIG. 7 to FIG. 6 shows that despite the narrower borehole in FIG. 6 (6½ inches compared to the 12¼ inch borehole for which data is shown in FIG. 6), which would provide greater stress on the fluid, the fluid performance is effectively the same.

Figure 8:
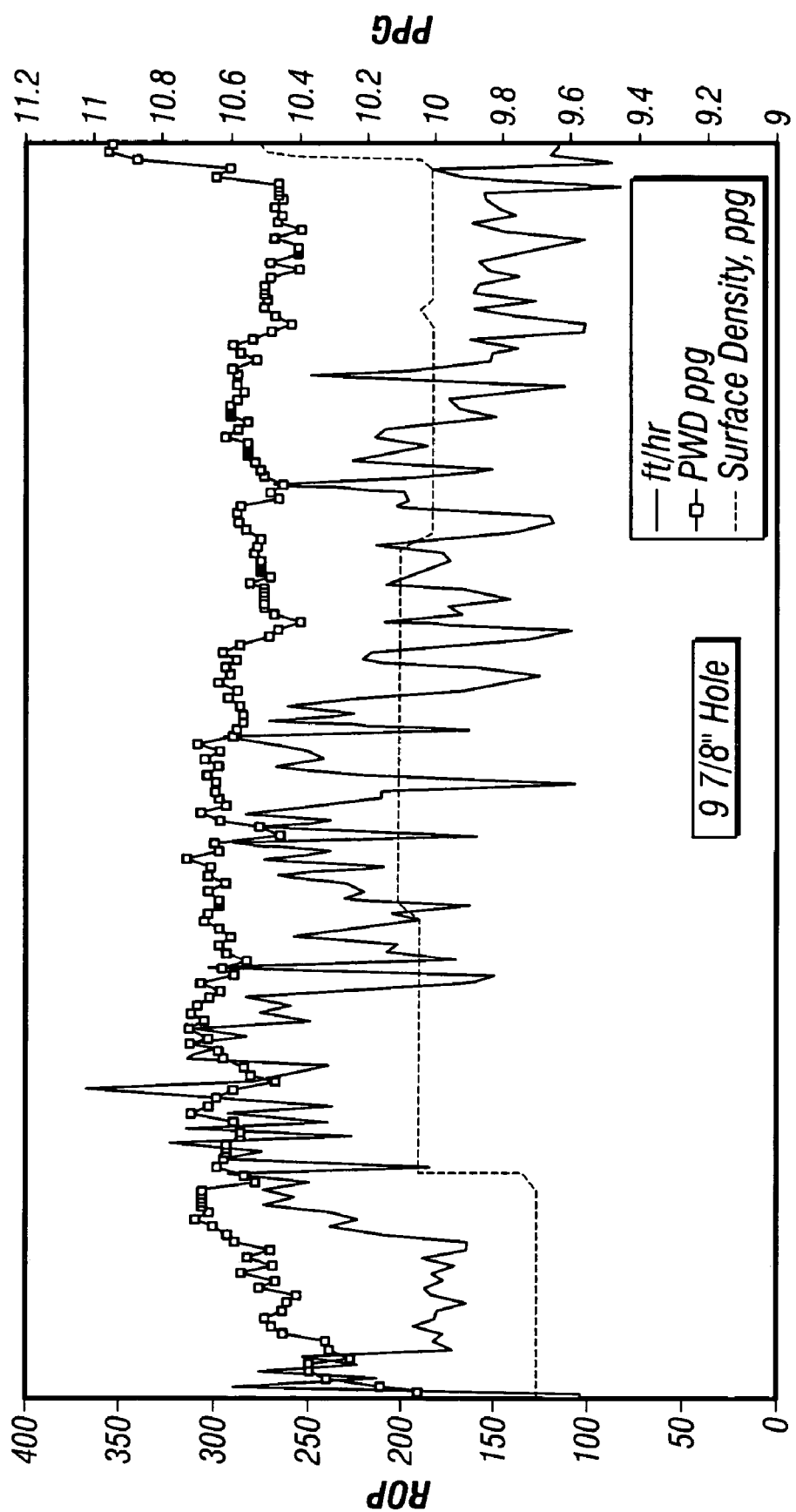
FIG. 8 is a graph comparing the differences in well surface density and the equivalent circulating density for a fluid of the invention at varying drilling rates from 4,672 ft to 12,250 ft, and a flowrate of 522 to 586 gallons per minute in a 9⅞" borehole.

FIG. 8 graphs the equivalent circulating density of an ACCOLADE™ system, as measured—downhole during drilling of a 9⅞ inch borehole from 4,672 feet to 12,250 feet in deepwater, pumping at 522 to 585 gallons per minute, and compares it to the surface density of the fluid and the rate of penetration ("ROP") (or drilling rate). The drilling fluid provided low, consistent ECDs even at the higher drilling rates.

The present invention also provides a drilling fluid with a relatively flat rheological profile. Table 2 provides example rheological data for a drilling fluid of the invention comprising 14.6 pounds per gallon ("ppg") of an ACCOLADE™ system.

TABLE 2

ACCOLADE ™ System Downhole Properties
FANN 75 Rheology
14.6 lb/gal ACCOLADE ™ System

| Temp. (° F.) | 120 | 40 | 40 | 40 | 80 | 210 | 230 | 250 | 270 |
|---|---|---|---|---|---|---|---|---|---|
| Pressure | 0 | 0 | 3400 | 6400 | 8350 | 15467 | 16466 | 17541 | 18588 |
| 600 rpm | 67 | 171 | 265 | 325 | 202 | 106 | 98 | 89 | 82 |
| 300 rpm | 39 | 90 | 148 | 185 | 114 | 63 | 58 | 52 | 48 |
| 200 rpm | 30 | 64 | 107 | 133 | 80 | 49 | 45 | 40 | 37 |
| 100 rpm | 19 | 39 | 64 | 78 | 47 | 32 | 30 | 27 | 25 |
| 6 rpm | 6 | 6 | 10 | 11 | 11 | 8 | 9 | 8 | 8 |
| 3 rpm | 5 | 6 | 10 | 11 | 11 | 8 | 9 | 8 | 8 |
| Plastic Viscosity (cP) | 28 | 81 | 117 | 140 | 88 | 43 | 40 | 37 | 34 |

TABLE 2-continued

ACCOLADE ™ System Downhole Properties
FANN 75 Rheology
14.6 lb/gal ACCOLADE ™ System

| Yield Point (lb/100 ft²) | 11 | 9 | 31 | 45 | 26 | 20 | 18 | 15 | 14 |
|---|---|---|---|---|---|---|---|---|---|
| N | 0.837 | 0.948 | 0.869 | 0.845 | 0.906 | 0.799 | 0.822 | 0.855 | 0.854 |
| K | 0.198 | 0.245 | 0.656 | 0.945 | 0.383 | 0.407 | 0.317 | 0.226 | 0.21 |
| Tau 0 (lb/100 ft² | 4.68 | 6.07 | 8.29 | 8.12 | 9.68 | 7.45 | 8.21 | 8.29 | 7.75 |

Figure 9A:
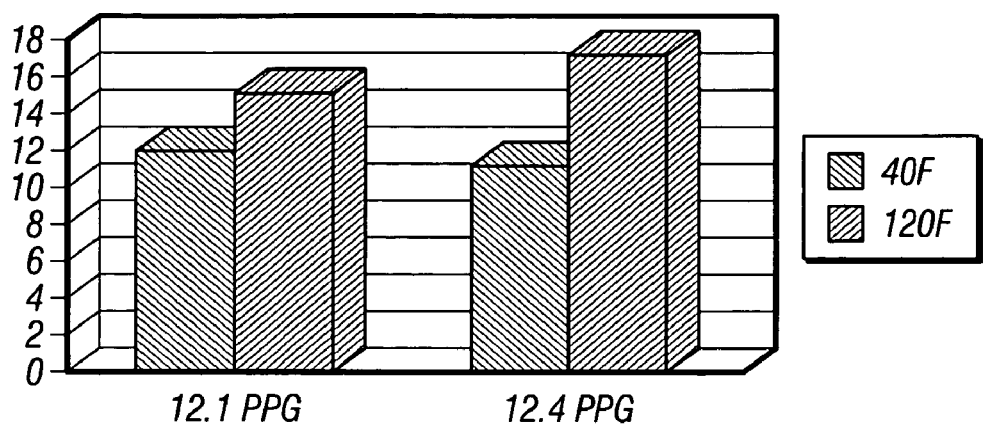
FIG. 9(a) is a bar graph comparing the yield point of two densities of a fluid of the invention at standard testing temperatures of 40 and 120 degrees Fahrenheit.
Figure 9B:
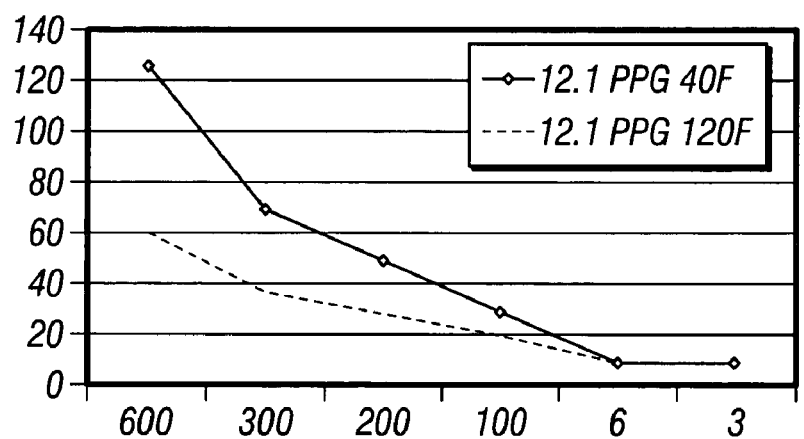
FIGS. 9(b) and (c) are graphs of the Fann instrument dial readings for these same two densities of a fluid of the invention over a range of shear rates at standard testing temperatures of 40 and 120 degrees Fahrenheit.
Figure 9C:
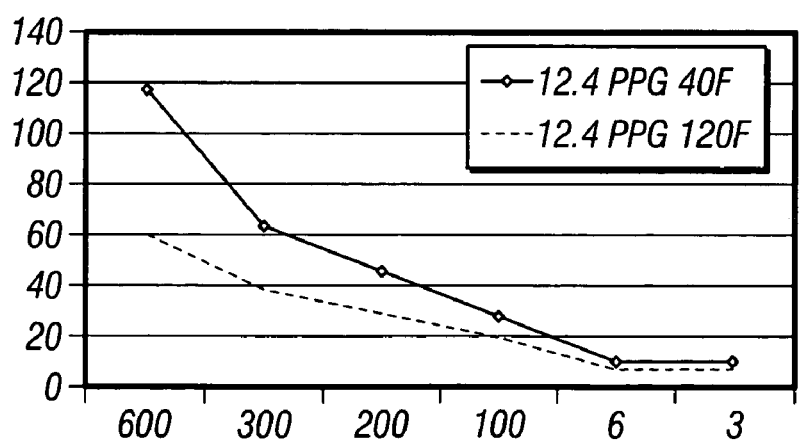

FIGS. 9(b) and (c) compare the effect of temperature on pressures observed with two different fluid weights (12.1 and 12.4 ppg) when applying six different and increasing shear rates (2, 6, 100, 200, 300, and 600 rpm). Two common testing temperatures were used—40 and 120 degrees Fahrenheit. The change in temperature and fluid weight resulted in minimal change in fluid behavior. FIG. 9(a) compares the yield point of two different weight formulations (12.1 pounds per gallon and 12.4 pounds per gallon) of a fluid of the present invention at two different temperatures (40 degrees Fahrenheit and 120 degrees Fahrenheit). The yield point is unexpectedly lower at 40 degrees than at 120 degrees. Prior art oil-based fluids typically have lower yield points at higher temperatures, as traditional or prior art oils tend to thin or have reduced viscosity as temperatures increase. In contrast, the fluid of the invention can be thinned at lower temperatures without significantly affecting the viscosity of the fluid at higher temperatures. This feature or characteristic of the invention is a further indicator that the invention will provide good performance as a drilling fluid and will provide low ECDs. Moreover, this characteristic indicates the ability of the fluid to maintain viscosity at higher temperatures.

Figure 10:
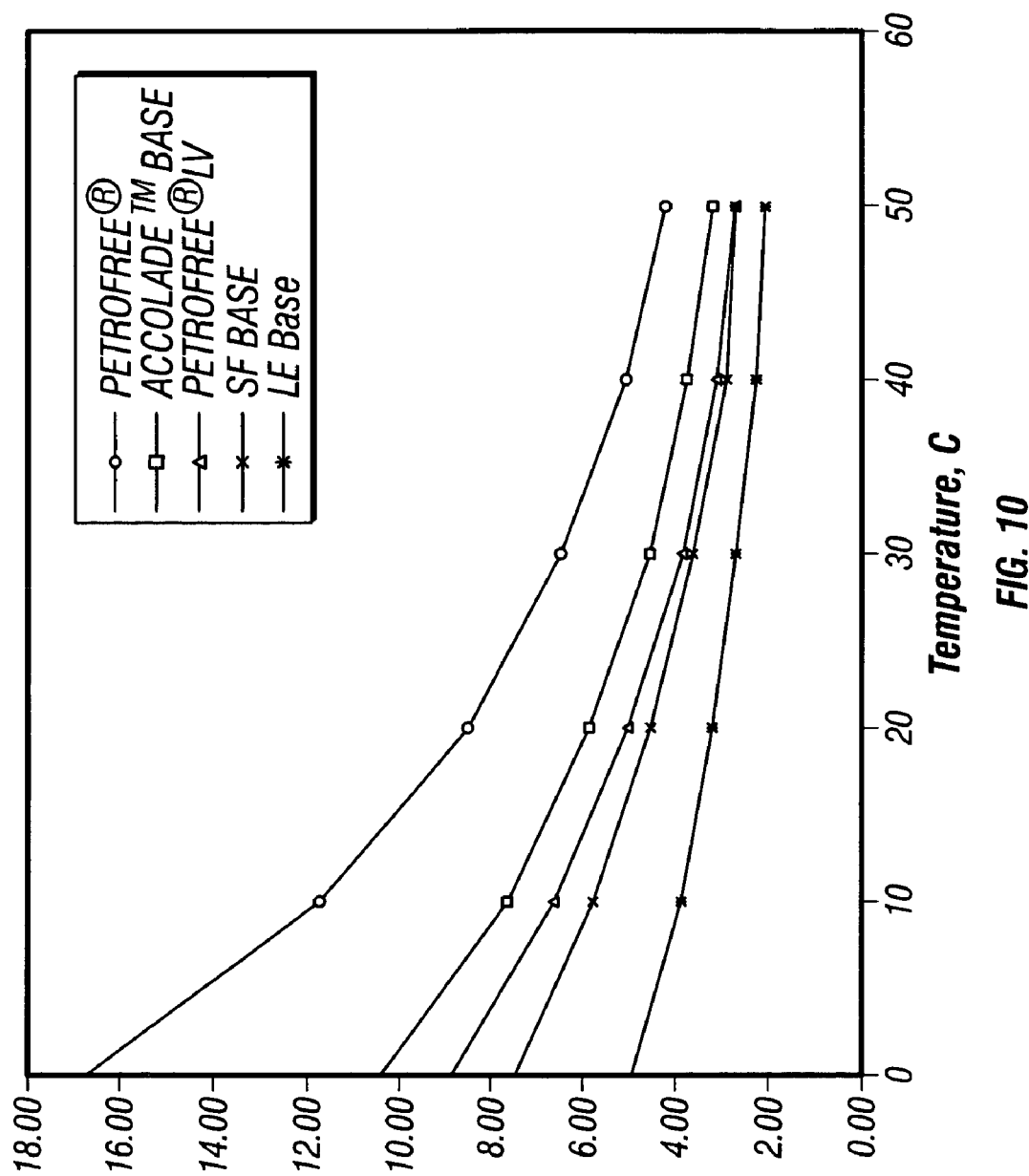
FIG. 10 is a graph comparing the viscosity of various known invert emulsion bases for drilling fluids with the invert emulsion base for a drilling fluid of the present invention.

FIG. 10 compares the viscosity of a base fluid for comprising a drilling fluid of the present invention with known base fluids of some prior art invert emulsion drilling fluids. The base fluid for the drilling fluid of the present invention is one of the thickest or most viscous. Yet when comprising a drilling fluid of the invention, the drilling fluid has low ECDs, provides good suspension of drill cuttings, satisfactory particle plugging and minimal fluid loss in use. Such surprising advantages of the drilling fluids of the invention are believed to be facilitated in part by a synergy or compatibility of the base fluid with appropriate thinners for the fluid.

Thinners disclosed in International Patent Application Nos. PCT/US00/35609 and PCT/US00/35610 of Halliburton Energy Services, Inc., Cognis Deutschland GmbH & Co KG., Heinz Muller, Jeff Kirsner (co-inventor of the present invention) and Kimberly Burrows (co-inventor of the present invention), both filed Dec. 29, 2000 and entitled "Thinners for Invert Emulsions," and both incorporated herein by reference, are particularly useful in the present invention for effecting such "selective thinning" of the fluid of the present invention; that is thinning at lower temperatures without rendering the fluid too thin at higher temperatures. Such thinners may have the following general formula: R—$(C_2H_4O)_n(C_3H_6O)_m(C_4H_8O)_k$—H ("formula I"), where R is a saturated or unsaturated, linear or branched alkyl radical having about 8 to about 24 carbon atoms, n is a number ranging from about 1 to about 10, m is a number ranging from about 0 to about 10, and k is a number ranging from about 0 to about 10. Preferably, R has about 8 to about 18 carbon atoms; more preferably, R has about 12 to about 18 carbon atoms; and most preferably, R has about 12 to about 14 carbon atoms. Also, most preferably, R is saturated and linear.

The thinner may be added to the drilling fluid during initial preparation of the fluid or later as the fluid is being used for drilling or well service purposes in the formation. The quantity added is an effective amount to maintain or effect the desired viscosity of the drilling fluid. For purposes of this invention, an "effective amount" of thinner of formula (I) is preferably from about 0.5 to about 15 pounds per barrel of drilling fluid or mud. A more preferred amount of thinner ranges from about 1 to about 5 pounds per barrel of drilling fluid and a most preferred amount is about 1.5 to about 3 pounds thinner per barrel of drilling fluid.

The compositions or compounds of formula (I) may be prepared by customary techniques of alkoxylation, such as alkoxylating the corresponding fatty alcohols with ethylene oxide and/or propylene oxide or butylene oxide under pressure and in the presence of acidic or alkaline catalysts as is known in the art. Such alkoxylation may take place blockwise, i.e., the fatty alcohol may be reacted first with ethylene oxide, propylene oxide or butylene oxide and subsequently, if desired, with one or more of the other alkylene oxides. Alternatively, such alkoxylation may be conducted randomly, in which any desired mixture of ethylene oxide, propylene oxide and/or butylene oxide is reacted with the fatty alcohol.

In formula (I), the subscripts n and m respectively represent the number of ethylene oxide (EO) and propylene oxide (PO) molecules or groups in one molecule of the alkoxylated fatty alcohol. The subscript k indicates the number of butylene oxide (BO) molecules or groups. The subscripts n, m, and k need not be integers, since they indicate in each case statistical averages of the alkoxylation. Included without limitation are those compounds of the formula (I) whose ethoxy, propoxy, and/or butoxy group distribution is very narrow, such as for example, "narrow range ethoxylates" also called "NREs" by those skilled in the art.

To accomplish the purposes of this invention, the compound of formula (I) must contain at least one ethoxy group. Preferably, the compound of formula I will also contain at least one propoxy group ($C_3H_6O$—) or butoxy group ($C_4H_8O$—). Mixed alkoxides containing all three alkoxide groups—thylene oxide, propylene oxide, and butylene oxide—are possible for the invention but are not preferred.

Preferably, for use according to this invention, the compound of formula (I) will have a value for m ranging from about 1 to about 10 with k zero or a value for k ranging from about 1 to about 10 with m zero. Most preferably, m will be about 1 to about 10 and k will be zero.

Alternatively, such thinners may be a non-ionic surfactant which is a reaction product of ethylene oxide, propylene oxide and/or butylene oxide with $C_{10-22}$ carboxylic acids or $C_{10-22}$ carboxylic acid derivatives containing at least one double bond in position 9/10 and/or 13/14 having units of the general formula:

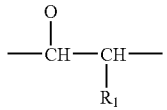

("formula II") where $R_1$ is a hydrogen atom or an OH group or a group $OR_2$, where $R_2$ is an alkyl group of about 1 to about 18 carbon atoms, or an alkenyl group of about 2 to about 18 carbon atoms or a group of the formula:

where $R_3$ is a hydrogen atom, or an alkyl group of about 1 to about 21 carbon atoms or an alkylene group of about 2 to about 21 carbon atoms. A formula (II) thinner may be used alone or may be used in combination with a formula (I) thinner or co-thinner.

Preferred commercially available thinners include, for example, products having the tradenames COLDTROL® (alcohol derivative), OMC2™ (oligomeric fatty acid), ATC® (modified fatty acid ester), to be used alone or in combination, and available from Halliburton Energy Services, Inc. in Houston, Tex.

The formulations of the fluids of the invention, and also the formulations of the prior art isomerized olefin based drilling fluids, used in drilling the boreholes cited in the data above, vary with the particular requirements of the subterranean formation. Table 3 below, however, provides example formulations and properties for these two types of fluids discussed in the field data above. All trademarked products in Table 3 are available from Halliburton Energy Services, Inc. in Houston, Tex., including: LE MUL™ emulsion stabilizer (a blend of oxidized tall oil and polyaminated fatty acid); LE SUPERMUL™ emulsifier (polyaminated fatty acid); DURATONE® HT filtration control agent (organophilic leonardite); ADAPTA® HP filtration control agent (methylstyrene/acrylate copolymer particularly suited for providing HPHT filtration control in non-aqueous fluid systems); RHEMOD L™ suspension agent/viscosifier (modified fatty acid comprising dimeric and trimeric fatty acids); GELTONE® II viscosifier (organophilic clay); VIS-PLUS® suspension agent (carboxylic acid); BAROID® weighting agent (ground barium sulfate); and DEEP-TREAT® wetting agent/thinner (sulfonate sodium salt). In determining the properties in Table 3, samples of the fluids were sheared in a Silverson commercial blender at 7,000 rpm for 10 minutes, rolled at 150 degrees Fahrenheit for 16 hours, and stirred for 10 minutes. Measurements were taken with the fluids at 120 degrees Fahrenheit, except where indicated otherwise.

TABLE 3

Example Formulations

|  | ACCOLADE ™ System | Isomerized Olefin Based Invert Emulsion Drilling Fluid |
|---|---|---|
| Fluids and Compounds | | |
| ACCOLADE ™ Base (bbl) | 0.590 | — |
| SF ™ Base (bbl) | — | 0.568 |
| LE MUL ™[1] (lb) | — | 4 |
| LE SUPERMUL ™[2] (lb) | 10 | 6 |
| Lime (lb) | 1 | 4 |
| DURATONE ® HT[3] (lb) | — | 4 |
| Freshwater (bbl) | 0.263 | 0.254 |
| ADAPTA ® HP[4] (lb) | 2 | — |
| RHEMOD L ™[5] (lb) | 1 | — |
| GELTONE ® II[6] (lb) | — | 5 |
| VIS-PLUS ®[7] (lb) | — | 1.5 |
| BAROID ®[8] (lb) | 138 | 138 |
| Calcium chloride (lb) | 32 | 31 |
| DEEP-TREAT ®[9] (lb) | — | 2 |
| B. Properties | | |
| Plastic Viscosity (cP) | 19 | 19 |
| Yield Point (lb/100 ft²) | 13 | 14 |
| 10 second gel (lb/100 ft²) | 9 | 7 |
| 10 minute gel (lb/100 ft²) | 12 | 9 |
| HPHT Temperature (° F.) | 225 | 200 |
| HPHT @ 500 psid (mL) | 0.8 | 1.2 |
| Electrical stability (volts) | 185 | 380 |
| Fann ™ Dial Readings: | | |
| 600 rpm | 51 | 52 |
| 300 rpm | 32 | 33 |
| 200 rpm | 25 | 26 |
| 100 rpm | 18 | 18 |
| 6 rpm | 7 | 7 |
| 3 rpm | 5 | 6 |

[1]Blend of oxidized tall oil and polyaminated fatty acid emulsion stabilizer.
[2]Polyaminated fatty acid emulsifier.
[3]Organophilic leonardite filtration control agent.
[4]Copolymer HTHP filtration control agent for non-aqueous systems.
[5]Modified fatty acid suspension agent/viscosifier.
[6]Organophilic clay viscosifier.
[7]Carboxylic acid suspension agent.
[8]Ground barium sulfate weighting agent.
[9]Sulfonate sodium salt wetting agent/thinner.

The present invention is directed to using invert emulsion based drilling fluids that contain fragile gels or exhibit fragile gel behavior in drilling operations, such as drilling, running casing, and cementing. The present invention is also directed to reducing the loss of drilling fluids or drilling muds during such drilling operations by employing invert emulsion based drilling fluids that contain fragile gels or exhibit fragile gel behavior, and that preferably provide low ECDs.

The invert emulsion drilling fluids of the present invention have an invert emulsion base. This base is not limited to a single formulation. Test data discussed above is from example invert emulsion drilling fluids of the invention comprising a blend of one or more esters and one or more isomerized, or internal, olefins ("ester blend") such as described in U.S. patent application Ser. No. 09/929,465, of Jeff Kirsner (co-inventor of the present invention), Kenneth W. Pober and Robert W. Pike, filed Aug. 14, 2001, entitled "Blends of Esters with Isomerized Olefins and Other Hydrocarbons as Base Oils for Invert Emulsion Oil Muds," incorporated herein by reference. In such blend, preferably the esters will comprise at least about 10 weight percent of the blend and may comprise up to about 99 weight percent of the blend, although the esters may be used in any quantity. Preferred esters for blending are comprised of about $C_6$ to about $C_{14}$ fatty acids and alcohols, and are particularly or more preferably disclosed in U.S. Pat. No. Re. 36,066, reissued Jan. 25, 1999 as a reissue of U.S. Pat. No. 5,232, 910, assigned to Henkel KgaA of Dusseldorf, Germany, and Baroid Limited of London, England, and in U.S. Pat. No. 5,252,554, issued Oct. 12, 1993, and assigned to Henkel Kommanditgesellschaft auf Aktien of Dusseldorf, Germany and Baroid Limited of Aberdeen, Scotland. Esters disclosed in U.S. Pat. No. 5,106,516, issued Apr. 21, 1992, and U.S. Pat. No. 5,318,954, issued Jun. 7, 1984, both assigned to Henkel Kommanditgesellschaft auf Aktien, of Dusseldorf, Germany, may also be used. The most preferred esters for use in the invention are comprised of about $C_{12}$ to about $C_{14}$ fatty acids and 2-ethyl hexanol or about $C_8$ fatty acids and 2-ethyl hexanol. These most preferred esters are available commercially under tradenames PETROFREE® and PETROFREE LV™, respectively, from Halliburton Energy Services, Inc. in Houston, Tex. Although esters made with fatty acids and alcohols are preferred, esters made other ways, such as from combining olefins with either fatty acids or alcohols, may also be effective.

Isomerized, or internal, olefins for blending with the esters for an ester blend may be any such olefins, straight chain, branched, or cyclic, preferably having about 10 to about 30 carbon atoms. Isomerized, or internal, olefins having about 40 to about 70 weight percent $C_{16}$ and about 20 to about 50 weight percent $C_{18}$ are especially preferred. An example of an isomerized olefin for use in an ester blend in the invention that is commercially available is SF™ Base fluid, available from Halliburton Energy Services, Inc. in Houston, Tex. Alternatively, other hydrocarbons such as paraffins, mineral oils, glyceride triesters, or combinations thereof may be substituted for or added to the olefins in the ester blend. Such other hydrocarbons may comprise from about 1 weight percent to about 99 weight percent of such blend.

Invert emulsion drilling fluids may be prepared comprising SF™ Base without the ester, however, such fluids are not believed to provide the superior properties of fluids of the invention with the ester. Field data discussed above has demonstrated that the fluids of the invention are superior to prior art isomerized olefin based drilling fluids, and the fluids of the invention have properties especially advantageous in subterranean wells drilled in deep water. Moreover, it is believed that the principles of the method of the invention may be used with invert emulsion drilling fluids that form fragile gels or yield fragile gel behavior, provide low ECDs, and have (or seem to have) viscoelasticity that may not be comprised of an ester blend. One example of such a fluid may comprise a polar solvent instead of an ester blend.

Other examples of possible suitable invert emulsion bases for the drilling fluids of the present invention include isomerized olefins blended with other hydrocarbons such as linear alpha olefins, paraffins, or naphthenes, or combinations thereof ("hydrocarbon blends").

Paraffins for use in blends comprising invert emulsions for drilling fluids for the present invention may be linear, branched, poly-branched, cyclic, or isoparaffins, preferably having about 10 to about 30 carbon atoms. When blended with esters or other hydrocarbons such as isomerized olefins, linear alpha olefins, or naphthenes in the invention, the paraffins should comprise at least about 1 weight percent to about 99 weight percent of the blend, but preferably less than about 50 weight percent. An example of a commercially available paraffin suited for blends useful in the invention is called tradename XP-07™, available from Halliburton Energy Services, Inc. in Houston, Tex. XP-07™ is primarily a $C_{12-16}$ linear paraffin.

Examples of glyceride triesters for ester/hydrocarbon blends useful in blends comprising invert emulsions for drilling fluids for the present invention may include without limitation materials such as rapeseed oil, olive oil, canola oil, castor oil, coconut oil, corn oil, cottonseed oil, lard oil, linseed oil, neatsfoot oil, palm oil, peanut oil, perilla oil, rice bran oil, safflower oil, sardine oil, sesame oil, soybean oil, and sunflower oil.

Naphthenes or napthenic hydrocarbons for use in blends comprising invert emulsions for drilling fluids for the present invention may be any saturated, cycloparaffinic compound, composition or material with a chemical formula of $C_nH_{2n}$ where n is a number about 5 to about 30.

In still another embodiment, a hydrocarbon blend might be blended with an ester blend to comprise an invert emulsion base for a drilling fluid of the present invention.

The exact proportions of the components comprising an ester blend (or other blend or base for an invert emulsion) for use in the present invention will vary depending on drilling requirements (and characteristics needed for the blend or base to meet those requirements), supply and availability of the components, cost of the components, and characteristics of the blend or base necessary to meet environmental regulations or environmental acceptance. The manufacture of the various components of the ester blend (or other invert emulsion base) will be understood by one skilled in the art.

Further, the invert emulsion drilling fluid of the invention or for use in the present invention has added to it or mixed with the invert emulsion base, other fluids or materials needed to comprise a complete drilling fluid. Such materials may include for example additives to reduce or control temperature rheology or to provide thinning, such as, for example, additives having the tradenames COLDTROL®, RHEMOD L™, ATC®, and OMC2™; additives for providing temporary increased viscosity for shipping (transport to the well site) and for use in sweeps, such as, for example an additive having the tradename TEMPERUS™ (modified fatty acid); additives for filtration control, such as, for example additives having the tradename ADAPTA HP®; additives for high temperature high pressure control (HTHP) and emulsion stability, such as, for example, additives having the tradename FACTANT™ (highly concentrated tall oil derivative); and additives for emulsification, such as, for example additives having the tradename LE SUPERMUL™ (polyaminated fatty acid). Blends of thinners such as the OMC2™, COLDTROL®, and ATC® thinners can be more effective in fluids of the invention than a single one of these thinners. All of the aforementioned trademarked products are available from Halliburton Energy Services, Inc. in Houston, Tex., U.S.A.

The invert emulsion drilling fluid of the present invention preferably does not have added to it any organophilic clays. The fluid of the invention does not need organophilic clay or organophilic lignites to provide it needed viscosity, suspension characteristics, or filtration control to carry drill cuttings to the well surface. Moreover, the lack of organophilic clays and organophilic lignites in the fluid is believed to enhance the tolerance of the fluid to the drill cuttings. That is, the lack of organophilic clays and organophilic lignites in the fluid of the invention is believed to enable the fluid to suspend and carry drill cuttings without significant change in the fluid's rheological properties.

The foregoing description of the invention is intended to be a description of preferred embodiments. Various changes in the details of the described fluids and method of use can be made without departing from the intended scope of this invention as defined by the appended claims.

What is claimed is:

1. A method of drilling in a subterranean formation comprising the steps of: providing an invert emulsion drilling fluid; and drilling in the subterranean formation with the drilling fluid, the drilling fluid comprising:
    a continuous phase comprising an internal olefin,
    an internal phase comprising water,
    an emulsifier,
    a weighting agent,
    a modified fatty acid rheology modifier comprising dimeric and trimeric fatty acids, and
    a copolymer filtration control agent;
wherein the drilling fluid: suspends the weighting agent and/or drill cuttings when stresses or forces associated with the drilling are reduced or removed from the drilling fluid; and produces substantially no pressure spike upon resuming stopped drilling, as detected by pressure-while-drilling equipment or instruments.

2. The method of claim 1 wherein the drilling fluid is substantially ester-free.

3. The method of claim 1 wherein the drilling fluid is substantially free of organophilic clay.

4. The method of claim 1 wherein the drilling fluid is substantially free of lignite and/or an organophilic filtration control agent.

5. The method of claim 1 wherein the drilling fluid is substantially free of organophilic clay and lignite.

6. The method of claim 1 wherein the drilling fluid is exposed to temperatures in a range of from about 40° F. to about 120° F.

7. The method of claim 1 wherein the drilling fluid has a lower yield point at a temperature of about 40° F. than at a temperature of about 120° F.

8. The method of claim 1 wherein an equivalent circulating density of the drilling fluid approximates a surface density of the drilling fluid.

9. The method of claim 1 wherein the drilling is performed offshore.

10. The method of claim 1 wherein the drilling fluid is tolerant to drill cuttings.

11. The method of claim 1 wherein the drilling fluid does not exhibit significant sag when at rest.

12. The method of claim 1 wherein the drilling features a drilling fluid loss of less than about 1 barrel per barrel of hole drilled.

13. The method of claim 1 further comprising running casing and/or cementing a wellbore in the subterranean formation.

14. The method of claim 13 wherein loss of the drilling fluid is less than about 100 barrels of total drilling fluid when running casing and/or cementing.

15. The method of claim 13 wherein loss of the drilling fluid is less than about 500 barrels of total drilling fluid during drilling, running casing and cementing.

16. The method of claim 1 wherein the drilling fluid further comprises a thinner.

17. The method of claim 1 wherein the drilling fluid further comprises a thinner that reduces the viscosity of the drilling fluid at about 40° F. to a greater extent than it reduces the viscosity of the drilling fluid at about 120° F.

18. The method of claim 1 wherein the drilling fluid further comprises one or more additives selected from the group consisting of an emulsion stabilizer, a viscosifier, an HTHP additive, and a water activity lowering material.

19. An invert emulsion drilling fluid for use in drilling in a subterranean formation comprising:
    a continuous phase comprising an internal olefin,
    an internal phase comprising water,
    an emulsifier,
    a weighting agent,
    a modified fatty acid rheology modifier comprising dimeric and trimeric fatty acids, and
    a copolymer filtration control agent;
wherein the drilling fluid: suspends the weighting agent and/or drill cuttings when stresses or forces associated with drilling are reduced or removed from the drilling fluid; and produces substantially no pressure spike upon resuming stopped drilling, as detected by pressure-while-drilling equipment or instruments.

20. The drilling fluid of claim 19 wherein the invert emulsion base is substantially ester-free.

21. The drilling fluid of claim 19 wherein the drilling fluid is substantially free of organophilic clay.

22. The drilling fluid of claim 19 wherein the drilling fluid is substantially free of lignite.

23. The drilling fluid of claim 19 wherein the drilling fluid is substantially free of organophilic clay and lignite.

24. The drilling fluid of claim 19 wherein the drilling fluid is substantially free of an organophilic filtration control agent.

25. The drilling fluid of claim 19 wherein the drilling fluid is exposed to temperatures in a range of from about 40° F. to about 120° F.

26. The drilling fluid of claim 19 wherein the drilling fluid has a lower yield point at a temperature of about 40° F. than at a temperature of about 120° F.

27. The drilling fluid of claim 19 wherein an equivalent circulating density of the drilling fluid approximates a surface density of the drilling fluid.

28. The drilling fluid of claim 19 wherein the drilling is performed offshore.

29. The drilling fluid of claim 19 wherein the drilling is performed in a wellbore in the subterranean formation at a water depth greater than about 1,500 feet.

30. The drilling fluid of claim 19 wherein the drilling fluid is tolerant to drill cuttings.

31. The drilling fluid of claim 19 wherein the drilling fluid does not exhibit significant sag when at rest.

32. The drilling fluid of claim 19 wherein loss of the drilling fluid is less than about 1 barrel per barrel of hole drilled when dulling a wellbore in the subterranean formation.

33. The drilling fluid of claim 19 wherein loss of the drilling fluid is less than about 100 barrels of total drilling fluid when running casing and/or cementing a wellbore in the subterranean formation.

34. The drilling fluid of claim 19 wherein loss of the drilling fluid is less than about 500 barrels of total drilling fluid when drilling, running casing and cementing a wellbore in the subterranean formation.

35. The drilling fluid of claim 19 wherein the drilling fluid further comprises a thinner.

36. The drilling fluid of claim 19 wherein the drilling fluid further comprises a thinner that reduces the viscosity of the drilling fluid at about 40° F. to a greater extent than it reduces the viscosity of the drilling fluid at about 120° F.

37. The drilling fluid of claim 19 wherein the drilling fluid further comprises one or more additives selected from the group consisting of an emulsion stabilizer, a viscosifier, an HTHP additive, and a water activity lowering material.

38. The method of claim 1 wherein the internal olefin has about 40 to about 70 weight percent $C_{16}$ and about 20 to about 50 weight percent $C_{18}$.

39. The method of claim 1 wherein the drilling is drilling a wellbore in the subterranean formation at a water depth greater than about 1,500 feet.

40. The drilling fluid of claim 19 wherein the internal olefin has about 40 to about 70 weight percent $C_{16}$ and about 20 to about 50 weight percent $C_{18}$.

* * * * *